US006863762B2

(12) United States Patent
Sanada et al.

(10) Patent No.: US 6,863,762 B2
(45) Date of Patent: Mar. 8, 2005

(54) METHOD FOR MANUFACTURING FIBER AGGREGATE, FIBER AGGREGATE, AND LIQUID CONTAINER USING SUCH FIBER AGGREGATE

(75) Inventors: Mikio Sanada, Kanagawa (JP); Sadayuki Sugama, Ibaraki (JP); Shozo Hattori, Tokyo (JP); Hajime Yamamoto, Kanagawa (JP); Eiichiro Shimizu, Kanagawa (JP); Hiroshi Koshikawa, Kanagawa (JP); Hiroki Hayashi, Kanagawa (JP); Kenji Kitabatake, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 09/985,516

(22) Filed: Nov. 5, 2001

(65) Prior Publication Data

US 2002/0084013 A1 Jul. 4, 2002

(30) Foreign Application Priority Data

Nov. 9, 2000 (JP) ........................................ 2000-342065

(51) Int. Cl.[7] ........................... C08L 83/04; D01F 1/10; D06M 15/00

(52) U.S. Cl. ....................... 156/180; 156/181; 156/183; 156/308.2

(58) Field of Search ................................. 156/180, 181, 156/183, 308.2

(56) References Cited

U.S. PATENT DOCUMENTS

| | | | | |
|---|---|---|---|---|
| 4,313,124 | A | 1/1982 | Hars | 346/140 |
| 4,345,262 | A | 8/1982 | Shirato et al. | 346/140 |
| 4,459,600 | A | 7/1984 | Sato et al. | 346/140 |
| 4,463,359 | A | 7/1984 | Ayata et al. | 346/1.1 |
| 4,558,333 | A | 12/1985 | Sugitani et al. | 346/140 |
| 4,723,129 | A | 2/1988 | Endo et al. | 347/65 |
| 4,740,796 | A | 4/1988 | Endo et al. | 346/1.1 |
| 2001/0007463 | A1 | 7/2001 | Hayashi et al. | 347/86 |
| 2001/0035897 | A1 | 11/2001 | Hayashi et al. | 347/65 |
| 2003/0043241 | A1 | 3/2003 | Hattori et al. | 347/86 |

FOREIGN PATENT DOCUMENTS

| | | | |
|---|---|---|---|
| EP | 255205 A2 * | 2/1988 | D06M/15/647 |
| EP | 900875 | 3/1999 | |
| EP | 1106362 | 6/2001 | |
| EP | 1106363 | 6/2001 | |
| JP | 59-123670 | 7/1984 | |
| JP | 59-138461 | 8/1984 | |
| JP | 2000-280492 | 10/2000 | |

* cited by examiner

*Primary Examiner*—Sam Chuan Yao
(74) *Attorney, Agent, or Firm*—Fitzpatrick, Cella, Harper & Scinto

(57) ABSTRACT

A method for manufacturing a fiber aggregate formed by fiber having reforming surface comprises the steps of providing a fiber surface having thermoplastic resin at least on the surface layer thereof with a hydrophilic processing liquid containing polymer having a first portion with more hydrophilic group than the surface, and a second portion having interfacial energy different from that of the hydrophilic group, and interfacial energy substantially equal to the surface energy of the fiber; orientating the second portion toward the fiber surface, while orientating polymer to the side different from the surface of the first group; and forming a fiber absorber by heating the fiber having the reformed surface in the step of orientating polymer to thermally bond the contact points of fibers themselves. With this method of manufacture, it becomes possible to enhance the uniform property of the fiber aggregate still more, which is formed subsequent to making the property of such fiber aggregate uniform per unit of single fiber or small aggregate existing in any one of stages before the formation thereof.

10 Claims, 24 Drawing Sheets

UNTREATED 150×

UNTREATED 500×

UNTREATED 2000×

ACIDIZED 150×

HYDROPHILICALLY TREATED 150×

HYDROPHILICALLY TREATED 500×

HYDROPHILICALLY TREATED 2000×

METHOD FOR MANUFACTURING FIBER AGGREGATE, FIBER AGGREGATE, AND LIQUID CONTAINER USING SUCH FIBER AGGREGATE

BACKGROUND OF THE INVENTION

1. Field of the Invention

The present invention relates to a method for manufacturing a fiber aggregate having the fiber surface which has been given a reforming process. The invention also relates to a liquid supply method that utilizes a fiber aggregate manufactured by such method of manufacture, and an ink supply unit as well.

2. Related Background Art

The ink tank used for an ink jet recording apparatus contains absorber in the tank to keep ink by means of the inner pressure exerted by such absorber, and maintains meniscus stably at the ink discharge portion of a recording head.

As one of ink adsorbents that generate negative pressure in an ink tank of the kind, there is a fiber element that holds ink between entangled fibers by use of capillary force. For this fiber element, the fiber, which is formed by polyorefine resin having polyethylene (PE) formed on the surface layer of polypropylene (PP), is practically used from the viewpoint of recycling capability, as well as the enhancement of wettability with resistance to ink.

On the other hand, the property or character of an object (element) itself is governed by the property of structural material. Conventionally, however, it has been practiced to obtain a desired property of an element by reforming such property of the material on the element surface. As the desired property, there is a reactive group having reactive property such as water-repellency or hydrophilic property or the one that has a reactive group capable of reacting against an additive.

Conventionally, a surface reformation of the kind has been practiced in general is such that the element surface is made radical by use of ozone or UV, or UV and ozone, and that the main compound of a processing agent is formed only by chemical binding.

In contrast, there is the one that obtains a desired property instantaneously by the adhesion to the element surface the processing agent that has such desired property itself without making the element surface radical. However, the resultant effect thereof does not last long.

Particularly, for the hydrophilic processing for the olefine resin which is favorable from the environmental standpoint, there is only known the conventional method for obtaining temporarily an imperfect hydrophilic condition under the presence of liquid by the mixture of surface active agent.

Also, conventionally, there has been used adhesive or primer for forming an additive layer for an element. Among such agents, the primer, such as silane coupling agent, that effectuates only reaction binding on the element surface, needs processing to enable the element itself to react.

As a primer, there is also the type that utilizes the affinity brought about by use of the same material as the target element. As a primer of the kind, acid-denatured chlorinated polypropylene, which is used for giving a coating layer of polyurethane resin to polypropylene as the final coat, is known, but when the same material agent as the element surface should be used, the resultant volume of the target element is increased. Besides, a technique is needed to perform a thin and uniform coating. Also, it is impossible to coat uniformly up to the inside of a fine element or a porous object. Particularly, acid-denatured chlorinated polypropylene is not soluble against water, and cannot be made water soluble. The use thereof is limited accordingly.

It can be stated, therefore, that there is no material, even among those different from the element surface, which can be made water soluble, and usable for a thin and uniform surface reformation irrespective of the configuration of an target element.

The present invention is designed on the basis of the new knowledge acquired during the studies on the criteria of the conventional technology and technique in this respect, and it is an epoch-making one.

With the conventional surface reformation only by means of chemical binding using radical process, a uniform surface reformation cannot be made on the surface having a complicated configuration. Here, in particular, no surface reformation can be effectuated in the inferior of a negative pressure generating member that has a complicated porous portion inside, such as a complex fiber element arranged to generate negative pressure to be used in the field of ink jet technology.

In addition, any method that uses the liquid, in which surface active agent is contained, is not effective in reforming the surface of porous object itself, and when the surface active agent is no longer present, its property is lost completely. The object is allowed to return to the property of the surface itself instantaneously.

Moreover, olefinic resin is excellent in water-repellent property having a contact angle of 80 degrees or more to water, but there is no surface reforming method therefor to make a desired hydrophilic property obtainable for a long time.

Under such circumstances, the inventors hereof have, at first, attempted the surface reformation of olefinic resin rationally, and with the elucidation of a method for maintaining the reformed property thereof, the inventors hereof have arrived at the use of liquid type processing agent after such studies as to provided the surface reforming method which is applicable to every element, while setting it forth as a premise that even the negative pressure generating member formed in a complicated configuration is also a target element that should be made processible.

As a result of assiduous studies for the achievement of the aforesaid objectives, the inventors hereof have proposed a epoch-making method as a hydrophilic processing art as per Japanese Patent Application Laid-Open No. 11-342618.

Here, although the reliability of a final product or a component can be enhanced by means of hydrophilic processing subsequent to having formed such final product or component with a fiber aggregate as the constituent thereof, it is often required to execute a processing step or take a processing time for providing the same property for both the surface area and inner area of such fiber aggregate.

SUMMARY OF THE INVENTION

It is a first object of the present invention to provide a method of manufacture capable of enhancing the uniform property of the fiber aggregate sill more, which is formed subsequent to making the property of such fiber aggregate uniform per unit of single fiber or small aggregate existing in any one of stages before the formation thereof.

It is a second object of the invention to provide, as another object thereof, a liquid supply method and a liquid supply unit using such method that utilizes the non-processed portion or the low-processed portion generated when processing the pre-processed single fiber or small aggregate.

The first invention for the achievement of the objects described above relates to a method for manufacturing a fiber aggregate formed by fiber having reforming surface, which comprises the steps of providing a fiber surface having thermoplastic resin at least on the surface layer thereof with a hydrophilic processing liquid containing polymer having a first portion with more hydrophilic group than the surface, and a second portion having interfacial energy different from that of the hydrophilic group, and interfacial energy substantially equal to the surface energy of the fiber; orientating the second portion toward the fiber surface, while orientating polymer to the side different from the surface of the first group; and forming a fiber absorber by heating the fiber having the reformed surface in the step of orientating polymer to thermally bond the contact points of fibers themselves.

It is desirable that the aforesaid method of manufacture further comprises a step of providing a catalyst for cleaving polymer in the processing liquid, and a step of cleaving polymer into subdivided polymer on the aforesaid surface of the portion by the utilization of the catalyst for cleaving polymer.

The second invention relates to a method for manufacturing a fiber aggregate formed by fiber having reforming surface, which comprises the steps of firstly, providing a fiber surface having thermoplastic resin at least on the surface layer thereof with a hydrophilic processing liquid containing subdivided products having a first portion and a second portion obtainable by cleaving polymer used for providing hydrophilic group having the first portion with hydrophilic group, and the second portion having interfacial energy different from that of the hydrophilic group, and interfacial energy substantially equal to the surface energy of the fiber; secondly, orientating the second portion of the granulates toward the surface on the surface side, while orientating the first portion to the side different from the surface; thirdly, condensing at least partly granulates orientated on the surface themselves for polymerization; and forming a fiber absorber by heating the fiber provided with the hydrophilic processing liquid to thermally bond the contact points of fibers themselves.

It is preferable that the aforesaid third step of condensation further comprises a heating step for effectuating the condensation. Further, it is preferable to execute the aforesaid heating step and the step of forming fiber absorber simultaneously.

A third invention relates to a method for manufacturing a fiber aggregate formed by fiber having reforming surface, which comprises the steps of immersing into hydrophilic processing liquid a small aggregate formed by fiber having olefine resin at least on the surface; reforming the fiber surface to be the surface having hydrophilic property by condensing and evaporating the hydrophilic processing liquid adhering to the fiber surface; and bundling small aggregates formed by fiber having the surface reformed to be given hydrophilic property thereon, and thermally bonding the contact points of fibers themselves by heating.

A fourth invention relates to a method for manufacturing a fiber aggregate formed by fiber having reforming surface, which comprises the steps of: enabling hydrophilic processing liquid to adhere to a small aggregate formed by fiber having olefine resin at least on the surface; reforming the fiber surface to be the surface having hydrophilic property by condensing and evaporating the hydrophilic processing liquid adhering to the fiber surface; forming small aggregates formed by fiber having the surface reformed to be given hydrophilic property thereon; and bundling the small aggregates and thermally bonding the contact points of fibers themselves by heating.

In accordance with the methods of manufacture of the third and fourth invention described above, the fiber surface is reformed to be provided with hydrophilic property per unit of single fiber or small aggregate existing in the stage before the fiber aggregate is manufactured finally, hence making it possible to make the hydrophilic property of the fiber aggregate move uniform on the entire area of the fiber aggregate as compared with the case where a surface reforming process is given after the finished fiber aggregate has been manufactured. Also, since the hydrophilic processing liquid adheres to the fiber surface in the stage of single fiber or small aggregate, the processing steps and processing time are made smaller than the case where the hydrophilic processing liquid adheres to the fiber aggregate finally formed.

As the hydrophilic processing liquid described above, it is preferable to use a liquid containing polyalkylsiloxane having hydrophilic group, acid, alcohol, and water. By use of a liquid of the kind as the processing liquid, it is easier to provide the hydrophilic property for the fiber surface of olefine resin.

Further, for the aforesaid method of manufacture, it is preferable that when hydrophilic liquid is condensed and evaporated, heating is given at a temperature higher than the room temperature, but lower than the fusion point of olefine resin.

It is preferable that the aforesaid small aggregate is formed by crimped short fibers, and the fiber direction is made uniform. With the crimped short fibers each in the uniform fiber direction, the small aggregate forms complicated meshes between adjacent fibers along with the crimping. As a result, even if the fiber direction is made uniform in one way, the fibers themselves form intersecting points that can be thermally bonded.

It is preferable to use, as the aforesaid fiber, a fiber having a core portion and a surface layer to cover the core portion, the core portion and the surface layer of which are formed by olefine resin, respectively, and the fusion point of resin forming the core portion of which is higher than the fusion point of resin forming the surface layer.

In this case, it is preferable that when the intersecting points of fiber themselves are thermally bonded, heating is made at a temperature higher than the fusion point of the surface layer and lower than the fusion point of the core portion. Then, preferably for the fiber, resin forming the core portion is polypropylene, and resin forming the surface layer is polyethylene. For a method of manufacture of the kind, the structure becomes such that polyethylene of the surface layer (casing material) are fused with each other on the location where fibers are in contact with each other.

Also a fifth invention relates to a method for manufacturing a fiber aggregate formed by fiber having reforming surface, which comprises the steps of providing a fiber surface having thermoplastic resin at least on the surface layer thereof with a hydrophilic processing liquid containing polymer having a first portion with more hydrophilic group than the surface, and a second portion having interfacial energy different from that of the hydrophilic group, and surface energy substantially equal to the surface energy of the fiber; and thermally bonding the contacts points of fibers themselves by heating the fibers provided with the processing liquid, and forming a fiber absorber having the surface reformed by orientating the first portion toward the fiber surface and the first portion to the side different from the surface.

A sixth invention relates to a method for manufacturing a fiber aggregate formed by fiber having reforming surface, which comprises the steps of: providing a fiber surface with a hydrophilic processing liquid containing polymer having a first portion having hydrophilic group, and a second portion having interfacial energy different from that of the hydrophilic group, and interfacial energy substantially equal to the surface energy of the fiber; and forming a fiber aggregate by heating fibers provided with the processing liquid, and forming a fiber absorber having the surface reformed by orientating the second portion toward the fiber surface, while orientating the first portion to the side different from the surface.

Further, the method of manufacture of each invention described above further comprises the step of cutting in a desired shape after the step of thermal bonding. The fiber aggregate which is manufactured by this method of manufacture is included in the scope of the present invention. After cutting the fiber aggregate has different property with respect to liquid on the cut section and non-cut section. In other words, the surface of the cut section is mostly formed by hydrophobic olefine resin, and the non-cut section is mostly formed by the fiber surface that has been given the hydrophilic process.

Also, the present invention includes a liquid container for containing the aforesaid fiber aggregate as a liquid absorber, which comprises a first chamber partially communicated with the atmosphere, having the fiber aggregate contained therein; a second chamber closed from the outside, containing liquid; a communicating passage for communicating the first chamber and the second chamber near the bottom of the container; and a liquid supply port for an ink jet head outside the container, and in this container, the cut section of the fiber aggregate faces the partition face of the first chamber and the second chamber. For the aforesaid ink jet head, the one that discharges liquid droplets from nozzles with thermal energy given to liquid is applicable.

For a liquid container of the kind, when the cut section of the fiber aggregate contained in the first chamber is set to face the partition face of the first chamber and the second chamber, the surface, which is formed mostly by hydrophobic olefine resin, is in contact with the partition face to make it difficult for liquid to reside between the fiber aggregate and the partition face. As a result, when liquid is supplied from the second chamber to the first chamber through the communicative passage along with the consumption of the contained liquid, the induction of the air from the first chamber to the second chamber by way of the communicative passage for the replacement of this supply of liquid can be effectuated rapidly between the fiber aggregate and the partition face that present small resistance to the air.

BRIEF DESCRIPTION OF THE DRAWINGS

FIG. 3A shows the example in which PE casing material covers PP core material almost coaxially; FIG. 3B shows schematically the example in which PE casing material covers PP core material in a state of being eccentric.

FIG. 5A shows schematically the utilization mode as an ink absorber in an ink tank; FIG. 5B, the entire configuration of PE•PP fiber element, and the arrangement direction thereof F1, as well as the direction F2 orthogonal thereto; FIG. 5C, the state before the PE•PP fiber element is formed by means of thermal fusion; and FIG. 5D, the state of the PE•PP fiber element being formed by means of thermal fusion.

FIG. 13A illustrates the case where both a first group as functional group, and a second group for the adhesion to the element surface are in the side chain of polymer; FIG. 13B, the case where the second group is contained in the main chain.

DETAILED DESCRIPTION OF THE PREFERRED EMBODIMENTS

Hereinafter, with reference to the accompanying drawings, the embodiments will be described in accordance with the present invention.

First Embodiment

Figure 1:
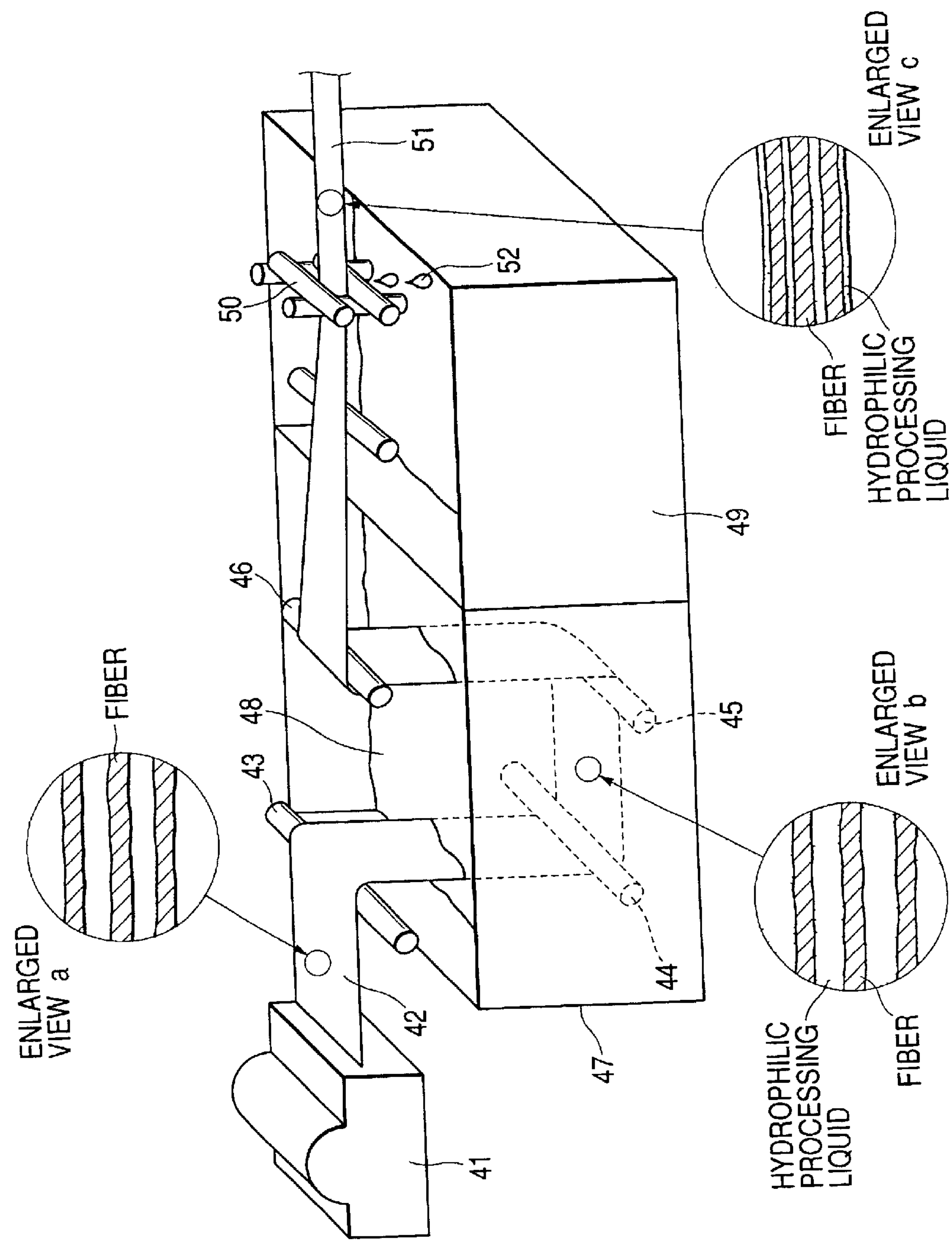
FIG. 1 is a view which shows the characteristics of a method for manufacturing a fiber aggregate in the base way in accordance with a first embodiment of the present invention.
Figure 2:
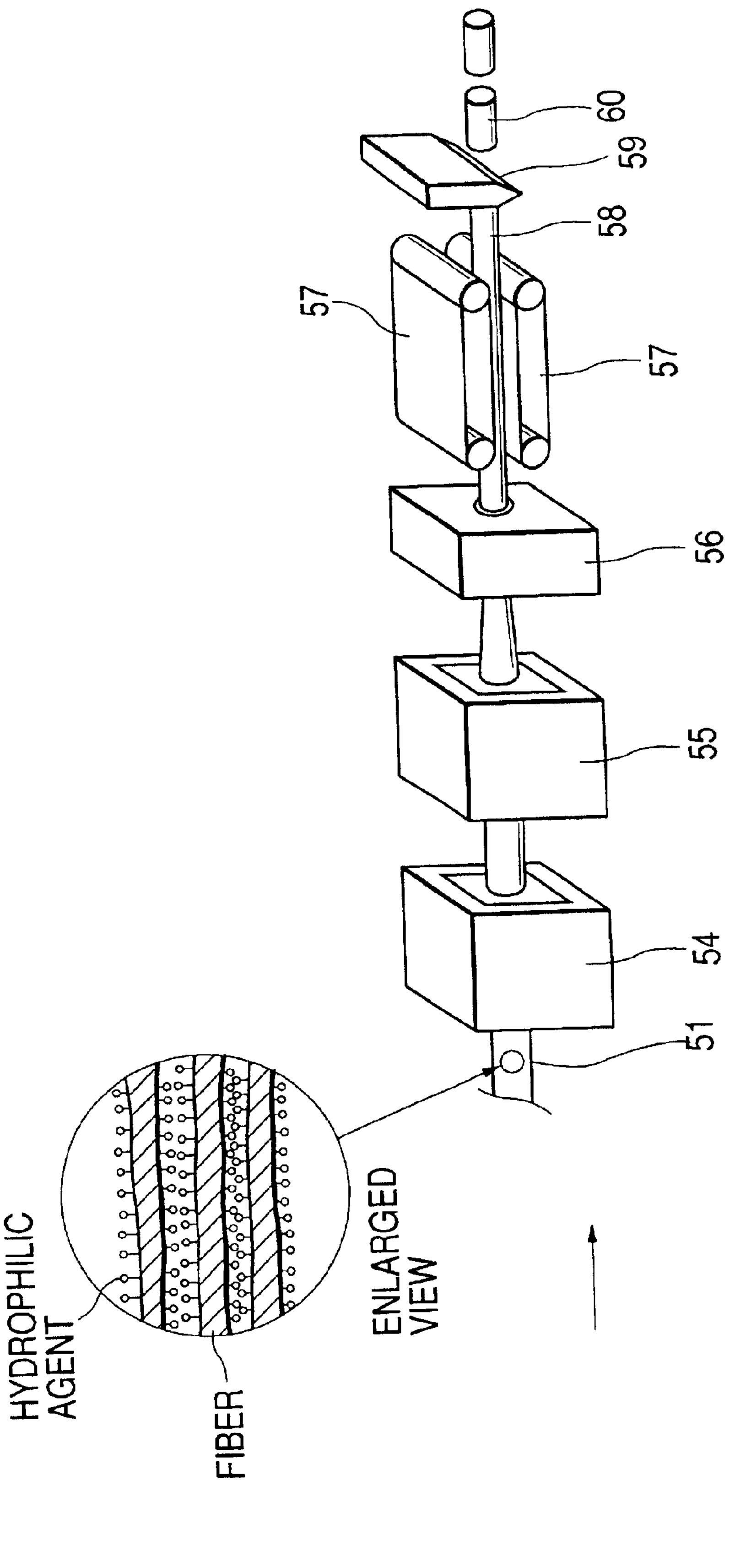
FIG. 2 is a view which illustrates in continuation the manufacturing process shown in FIG. 1.
Figure 3A:
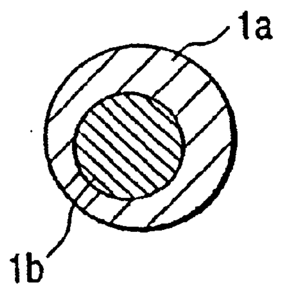
FIGS. 3A and 3B are views which illustrate one example of the sectional structure of PE•PP fiber used for the method of manufactured embodying the present invention.
Figure 3B:
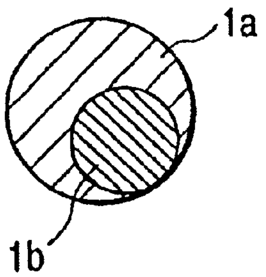
Figure 4:
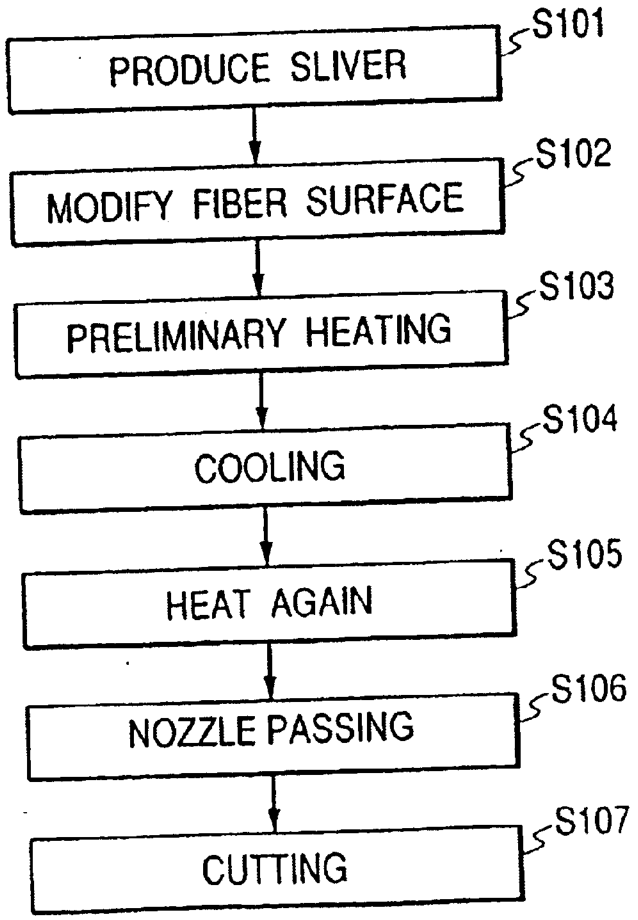
FIG. 4 is a flowchart which illustrates the method for manufacturing a fiber aggregate in accordance with the first embodiment of the present invention.

FIG. 1 is a view which shows the characteristics of a method for manufacturing a fiber aggregate in the base way in accordance with a first embodiment of the present invention. FIG. 2 is a view which illustrates in continuation the manufacturing process shown in FIG. 1. FIGS. 3A and 3B are cross-sectional views of fiber used for the present embodiment. FIG. 4 is a flowchart which illustrates the method for manufacturing a fiber aggregate in accordance with the first embodiment of the present invention. FIGS. 5A to 5D, and FIG. 6 are views which illustrate the structure of the fiber aggregate of the present embodiment.

In FIG. 1, after cutting the tow that gathers two kinds of thermoplastic synthetic fibers (or may be more than two kinds of them) having different fusion points, the tow thus cut is carried by air brow to pass a cotton comber 41. Then, the fiber that has been entangled complicatedly is disentangled to enable the fiber direction thereof to be substantially uniform (see an enlarge figure a), and processed to be a sheet web 42 having a stable unit weight. The web thus processed is arranged to get through hydrophilic processing liquid 48 in a processing tub 47 while being wound around rollers 43 to 46. At this juncture, the hydrophilic processing liquid is held in the gap between fibers (see an enlarged figure b). After that, the web 42 that holds hydrophilic processing liquid is bundled by use of a roller 50, thus manufacturing a sliver 51 which is a short fiber aggregate (step S101 in FIG. 4). At this time, by the compression (squeezing) of the roller 50, any excessive processing solution 52 that is held in the gap between fibers is removed (see an enlarged figure c) and such excessive processing solution 52 is collected into a collecting tub 49. Since this collecting tub 49 is connected with the processing tub 47, no processing liquid is used wastefully.

For the present embodiment, there is prepared a tow the section of which is as shown in FIG. 3A, having polyethylene (PE) fiber of fusion point of approximately 132° C. as the casing material 1*a*, and polypropylene (PE) fiber of fusion point of approximately 180° C. as the core material 1*b* for the manufacture of sliver. It may be possible to use a short fiber lump instead of the tow, and to supply material to the cotton comber subsequent to an opening process. Also, in order to obtain sliver in a required quantity, it may be possible to bundle webs each of which is obtainable from each of plural cotton combers.

Here, as the core-casing fibers, there are usable not only the one which is in the coaxial form as shown in FIG. 3A, but the one having the core material 1*b* to be eccentric in the casing material 1*a* as shown in FIG. 3B. Also, it may be possible to use a polyethylene fiber of monoaxial structure or a mixed fibers of polyethylene fiber and polypropylene fiber instead of the core-casing fibers as shown in FIGS. 3A and 3B. As the material for a synthetic fiber, it is not necessarily limited to the aforesaid polyethylene or polypropylene, but the olefine resin, which is environment-friendly, may well be usable, and also, some other material may be mixed if only the two kinds of thermoplastic synthetic fibers with different fusing points are adopted for the material to be used.

The sliver 51 wet with hydrophilic liquid as shown in FIG. 1 is passed through an oven next to condense and evaporate the hydrophilic processing liquid in the gaps between fibers for the formation of a polymeric film having hydrophilic group on the fiber surface (step S102 in FIG. 4). The hydrophilic processing steps will be described in detail in accordance with another embodiment.

Next, as shown in FIG. 2, the sliver 51 the fiber surface of which has been hydrophilic processed (see an enlarge figure in FIG. 2) is passed through a heating device 54 to give preliminary heating (step S103 in FIG. 4). The temperature of the preliminary heating in this heating device should desirably be at a temperature higher than the fusion point of a material having the lowest fusion point and lower than the fusion point of a material having the highest fusion point among the thermoplastic synthetic fibers that form the sliver 51. In this preliminary heating process, the temperature is gradually raised from the entrance of the preliminary heating device to the exit thereof. Thus, it becomes possible to continuously perform the hydrophilic process and the fiber binding process in this preliminary heating process. After the preliminary heating process performed in this manner, the sliver 51 is left intact in the atmosphere for cooling (step S104 in FIG. 4). Thus, it becomes possible to suppress the napping of the sliver surface, while thermally fusing the intersecting points (contact points) between fibers themselves on the surface layer of the sliver 51. In accordance with the present embodiment, the polyethylene fiber is fused to serve as bonding agent so that the intersecting points of polypropylene fibers of the core material are almost fixed. As a result, in the fiber binding formation process, the sliver 51 is prevented from being deformed in the stretching direction thereof. In this respect, the cooling process is not necessarily prerequisite, and it may be possible to perform a reheating process to be described later depending on the heating temperature at the time of preliminary heating.

Here, in the preliminary heating process, there is a fear that if hot air is blown onto the sliver 51, fibers are biased by the intensity of blast of wind when being fused, thus making it impossible to obtain the fiber aggregate having uniform fiber density. For the present embodiment, therefore, the interior of the heating device is kept at a temperature of 155° C., and the sliver 51 is conveyed therein for heating at a designated speed by use of a conveyer belt 57.

After that, the silver 51, the intersecting points of fibers themselves at least on the surface layer of which are fused, is brought to pass a heating device 55 different from the aforesaid heating device 54 for reheating (step S105 in FIG. 4). It is desirable that the heating temperature in this reheating process should also be set at a temperature higher than the fusion point of the material having the lowest fusion point and lower than the fusion point of the material having the highest fusion point among the thermoplastic synthetic fibers that form the silver 51 from the viewpoint of fusing the intersecting points between fibers. In this reheating process, the intersecting points between fibers in the interior of the silver 51 are fused, too, when passed through the nozzle to be described later. Therefore, it is desirable to make the time of passage longer for the silver 51 when passing the heated space if the silver 51 is allowed to move at a constant speed in the space in which the temperature is set at a designated one as in the case of the preliminary heating device. Here, in the state of being reheated, the intersecting points between fibers are fused on the silver surface layer. Therefore, instead of making the heating time longer, it may be possible to heat even the interior of the silver 51 by blowing hot air in a short period of time. For the present embodiment, the reheating is executed by blowing hot air at a temperature of approximately 140° C.

The reheated sliver is passed through the nozzle 56 kept approximately at a normal temperature of (25° C.) by use of the conveyer belt 57 to be a fiber bundle 58 (step S106 in FIG. 4). Here, the temperature of nozzle is maintained at a temperature sufficiently lower than the heating temperature (approximately 150° C.) of the heating devices 54 and 55 to make it possible to reliably fuse the intersecting points of fibers of the fiber bundle having a desired sectional configuration when passed through the nozzle, beginning with the intersecting points existing nearer to the surface. As a result, the desired configuration can be kept reliably, hence obtaining a fiber aggregate capable of generating a uniformly stabilized negative pressure.

Here, the nozzle temperature is adjusted. This is because there is a fear that the temperature of the nozzle, which is always in contact with the heated sliver, is raised to deteriorate the formation performance. For the present embodiment, the temperature of nozzle is maintained substantially at a normal temperature (25° C.±10° C.) by means of water cooling. This adjusted temperature is good enough if only it is sufficiently lower than the lowest fusing point of the fiber material to be used. The fiber bundle 58 formed by passing the nozzle is left intact in the atmosphere thereafter to cool it completely up to the central portion thereof, and then, cut in a desired length by use of a cutter 49 (step S107 in FIG. 4). In this way, the fiber aggregate 60 can be manufactured without losing shape or the like. In this respect, the sectional configuration of the fiber bundle 58 after passing the nozzle becomes larger than the sectional configuration of the nozzle. There is a tendency that if the fiber bundle is passed through the nozzle faster, the section of the fiber bundle becomes larger widthwise than the nozzle sectional configuration as compared with the case where it is passed through the nozzle slower. Also, even when the fiber bundle is passed through the same nozzle at the same speed, the sectional configuration of the fiber bundle is made closer to that of the nozzle as the number of passage is increased. As required, therefore, it may be possible to repeat the step of reheating the bundle after cooling and passing the bundle through the nozzle. Particularly, if the diameter of the sliver 51 should be larger than the intended diameter of the fiber bundle 58, it is desirable to allow the bubble to pass a plurality of nozzles, while the sectional configuration of each nozzle is made gradually smaller.

In accordance with the method of manufacture described above, the fiber surface is given the reforming process in the stage of web. Therefore, as compared with the case where the surface reforming process is given when the fiber aggregate is formed, it becomes possible to uniformalize the reformed property still more on the surface area and inner surface area of the fiber aggregate after manufactured.

Also, it is possible to form a cylindrical or square pillar fiber aggregate easily by cutting the fiber bundle thus formed in a desired length. The manufacturing process of this method is simple and excellent in productivity, hence making it possible to provide the fiber aggregate at low costs as a negative generating member, such as an ink absorber or ink supply member, among some others. In this respect, depending on the manufacturing devices (particularly, the heating devices) it may be possible to cut the sliver in an unit of several meters subsequent to the process in the step S102, and then, execute the steps after the preliminary heating as shown in the step S103. In this way, each step can be separated to share a heating device to be used in the preliminary heating process and the reheating process.

Also, for the embodiment described above, the sliver is used instead of the tow. Therefore, in the step where the fiber bundle is formed by passing it through the aforesaid nozzle, it becomes easier to manufacture a fiber aggregate which serves as the ink absorber capable of generating negative pressure optimally for use of an ink jet recording apparatus. In accordance with the studies made by the inventors hereof, it is confirmed that a fiber aggregate, which is manufactured with the sliver of 10 $\mu$m to 50 $\mu$m diameter, the fiber density of which is made 0.05 g/cm$^3$ to 0.40 g/cm$^3$ in the fiber bundle formation process, and used as an ink absorber in an ink tank, is able to generate negative pressure of several 10 mmAq. level in the ink tank.

Figure 5A:
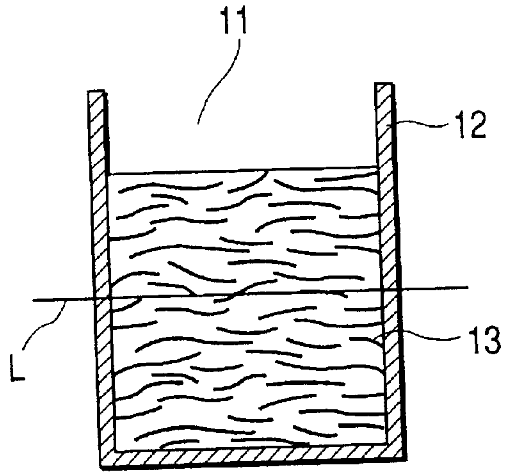
FIGS. 5A, 5B, 5C, and 5D are views which illustrate the fiber aggregate which is obtained by the method of manufacture of the present invention.
Figure 5B:
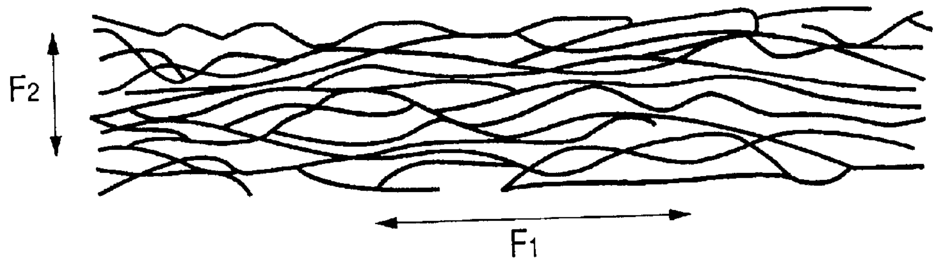

Also, the structure of the fiber aggregate 60 thus manufactured is such that fiber is continuously arranged mainly in the longitudinal direction (F1) as shown in FIG. 5B in order to make the fiber arrangement direction even by use of the cotton comber 41, and that fibers are in contact with each other locally. Then, with heating, fusion occurs with each other at the contact points (intersecting points) to form mesh structure so that mechanical elasticity is provided in the orthogonal direction (F2). Along with this, the stretching force is increased in the longitudinal direction (F1). In contrast, the stretching force becomes unfavorable in the orthogonal direction (F2). However, against the crushing deformation, the fiber aggregate presents the elastic structure having a restoring force.

Figure 5C:
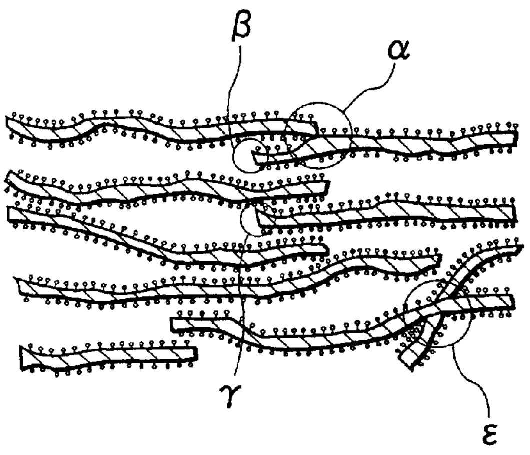
Figure 5D:
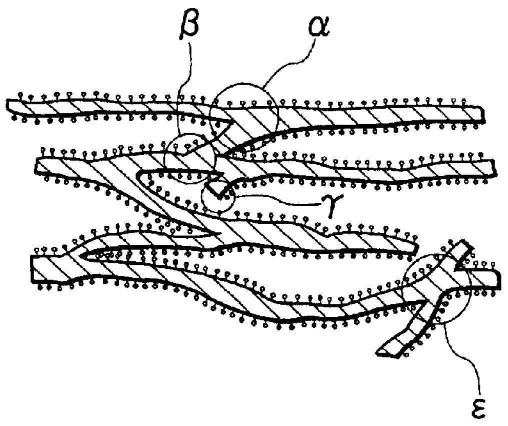

To observe this fiber aggregate more precisely, each of the fibers is crimped as shown in FIG. 5C, and along with this crimping, a complicated mesh structure is formed between adjacent fibers. As a result, when crimped short fibers are heated in a state that the fiber arrangement directions thereof are even to a certain extent, the fibers present condition as shown in FIG. 5D. Here, in the area a where a plurality of short fibers are superposed in the fiber arrangement direction in FIG. 5C, the intersecting points are fused as shown in FIG. 5D. As a result, this area becomes difficult to be cut in the direction F1 shown in FIG. 5B. Also, with the use of crimped short fibers, each of the end areas (at β, γ shown in FIG. 5C) of short fibers is fused with another short fiber (β) in three-dimensionally or remains as the end portion as it is (γ) as shown in FIG. 5D. In addition, not all the fibers are even in the same direction at all. As a result, the short fiber (at ϵ in FIG. 5C), which is inclined to be in contact with and intersecting another short fiber from the very beginning, is fused as it is after heating (at ϵ in FIG. 5D). In this way, it becomes possible to form fibers having more strength even in the F2 direction as compared with the conventional one directional fiber bundle.

Figure 6:
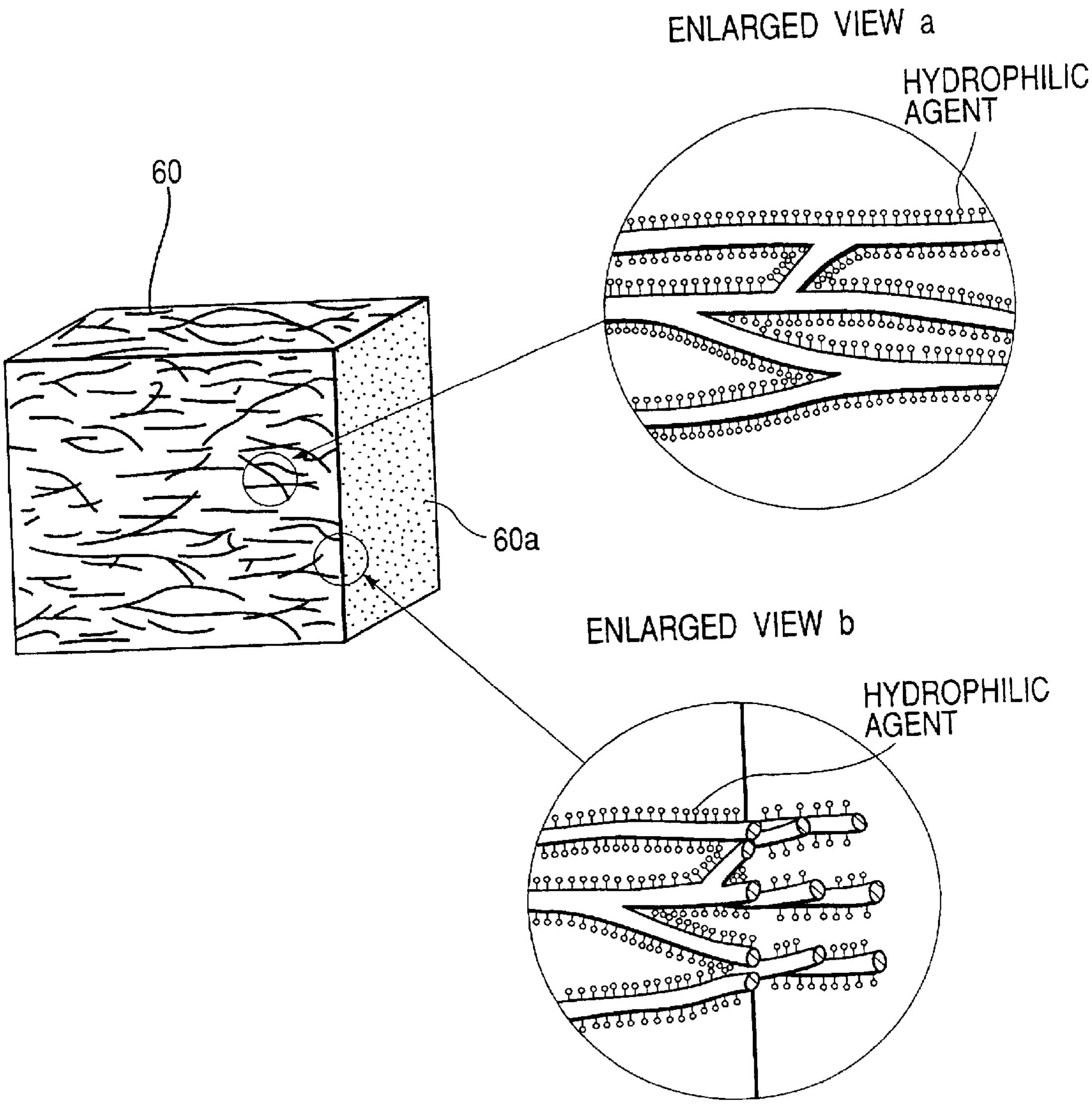
FIG. 6 is a view which illustrates the surface structure of a fiber aggregate obtained by the method of manufacture embodying the present invention.

Further, the cut section 60*a* on the outer side of the fiber aggregate 60, which is formed ultimately by cutting the fiber bundle having the reformed fiber surface, is structured with the fiber portion where no surface reformation is given as shown in FIG. 6.

In the fiber structure thus formed, there exists the fiber direction (F1) in which fibers are mainly arranged. As a result, if liquid should be dipped, the flowability and the holding condition thereof in the stationary state in the interior of such structure present distinct difference in the fiber direction (F1) and the direction (F2) orthogonal thereto. Thus, as shown in FIG. 5A, for example, should the aforesaid fiber aggregate be arranged as the ink solvent 13 in a container 12 of an appropriate shape having the opening 11 which is open to the air outside so that the main fiber direction (F1) is placed to be essentially perpendicular to the vertical direction, the gas-liquid interface L in the ink absorber 13 is arranged to be substantially in parallel with the main fiber direction F1.

Consequently, when ink is consumed, the interface between ink and the air is stably reduced substantially in horizontal direction, and when a plurality of the same kind ink tanks are mounted, the position of each supply port freely arranged within the bottom area, not necessarily arranged to be sharable by each of the tanks. For example, even if one of them is arranged on the central portion of the bottom face, while the rest of them are arranged on the corner portions of the bottom face, it is possible to suppress the variation of ink supply that may be generated by the respective ink tanks.

Now, in this respect, the aforesaid effect should be obtainable theoretically if only the arrangement direction of fiber is slightly inclined from the vertical direction, but practically, it has been confirmed that the effect is definitely obtainable if it is within a range of ±30 degrees to a horizontal plane. Here, therefore, the phrase "essentially perpendicular to the vertical direction" or "substantially horizontal" is understood to mean the aforesaid inclination in the specification hereof.

Further, with the housing of the aforesaid container 12 being formed with the same olefine material as the ink absorber 13 formed by the fiber aggregate, it becomes easier to collect the container after the complete consumption of ink as recycling material. Also, with the olefine fiber material used as the material of the ink absorber 13, it can demonstrate an excellent resistance to chemicals, and there is almost no fear that any eluted substance is generated in ink while being kept in storage. In this way, ink can be held in a stable condition for a long time.

Second Embodiment

The first embodiment describes the example in which the fiber surface is reformed in the state of sliver. Here, however, the description will be made of the example in which the fiber surface is reformed in the stage of the simple fiber as shown in FIGS. 7A and 7B, and FIGS. 8A and 8B.

Figure 7B:
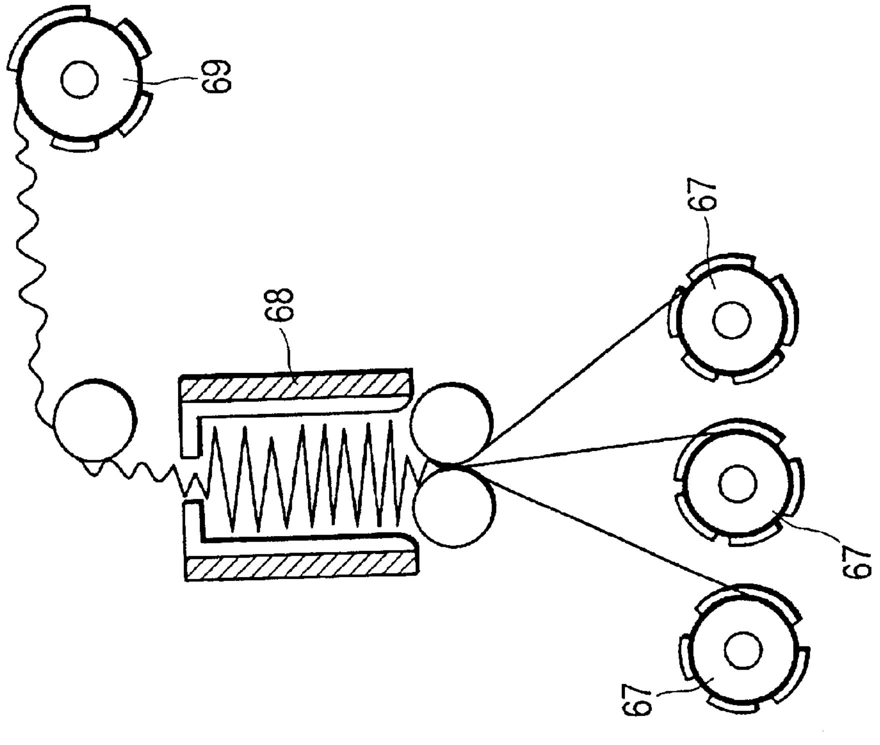
FIGS. 7A and 7B are views which schematically illustrate the manufacturing process of a long fiber (filament) having reformed surface in accordance with a second embodiment of the present invention.
Figure 7A:
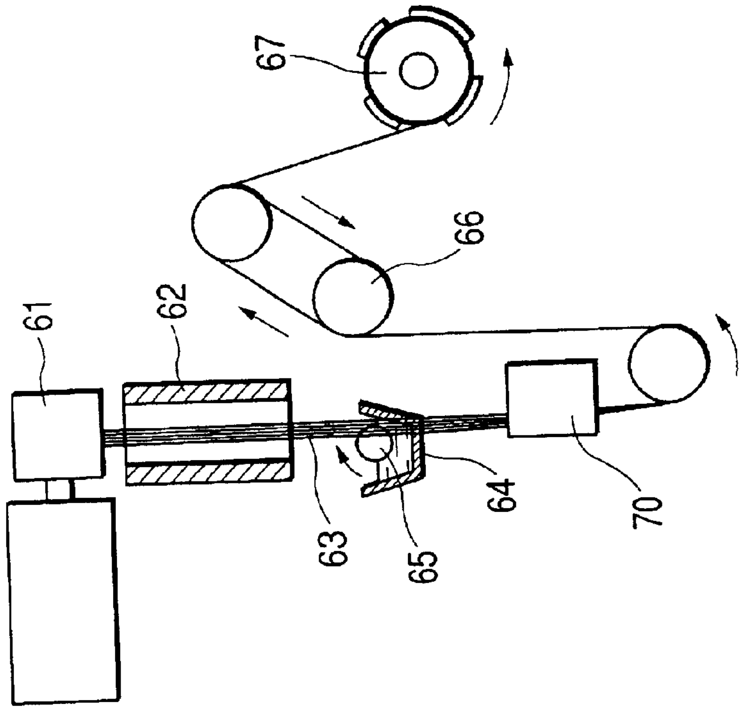

For the single fiber of the present embodiment, the thermoplastic synthetic fiber of biaxial structure, which is formed by polypropylene as the core material and polyethylene as the casing material, is used (see FIGS. 3A and 3B), but it should be good enough if fiber used is the environment friendly olefine resin, such as polyethylene of monoaxial structure. The synthetic fiber is roughly classified into filament (long fiber) and staple (short fiber). FIGS. 7A and 7B are views which schematically illustrate the manufacturing process of filament, and FIGS. 8A and 8B, that of staple.

In a case of the long fiber (filament), spinning is executed as shown in FIG. 7A by cooling material resin by use of an air cooling pipe 62 after it is molten and extruded out from an extruder 61. On the surface of fiber 63 after cooling, hydrophilic processing liquid 64 is coated by use of a roller 65, and then, the fiber is heated by a heating device 70. At this juncture, the hydrophilic processing liquid on the fiber surface is dried and evaporated to reform the fiber surface to provide hydrophilic function. The fiber thus reformed is wound by a bobbin 67 after being drawn by use of rollers 66. After that, as shown in FIG. 7B, a plurality of bobbins 67 are set at a crimping machine 68 to wind the reformed fibers by use of a winding coil 69.

Figure 8A:
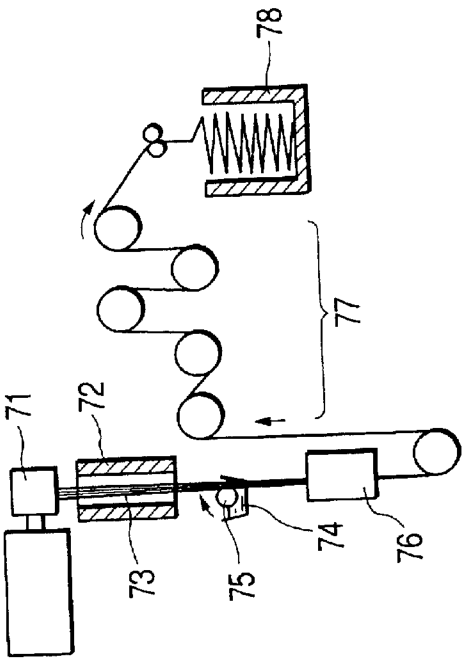
FIGS. 8A and 8B are views which schematically illustrate the manufacturing process of a short fiber (staple) having reformed surface in accordance with the second embodiment of the present invention.
Figure 8B:
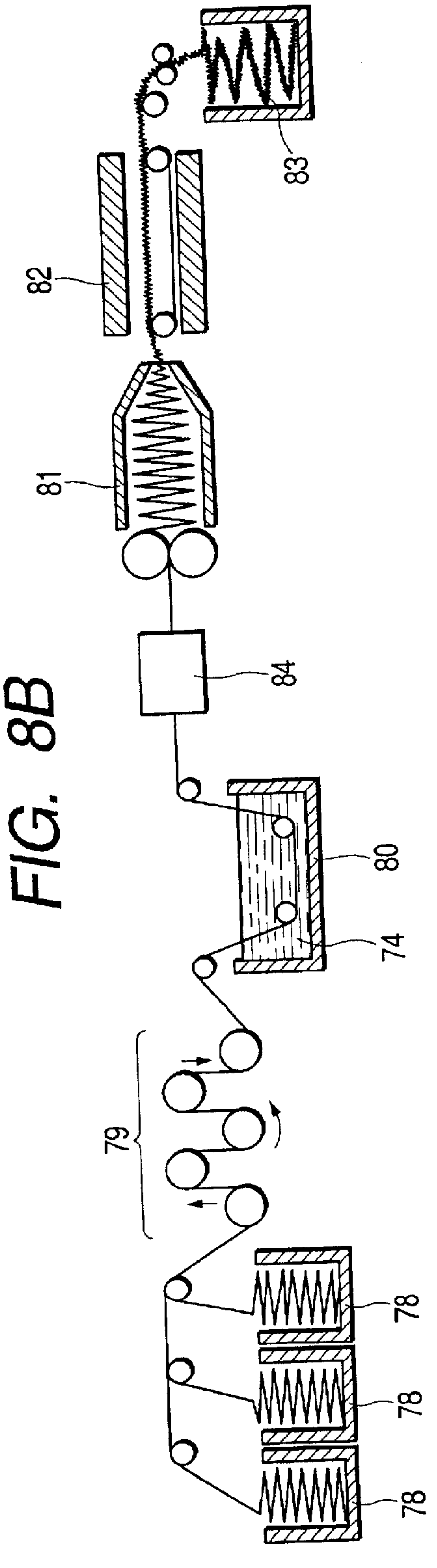

On the other hand, in a case of the short fiber (staple), the material resin is molten and extruded out from the extruder 71 as shown in FIG. 8A, and then, the extruded resin is cooled by use of the air cooling pipe 72 for spinning. After cooling, hydrophilic processing liquid 74 is coated on the surface of fiber 73 by use of the roller 75, and this fiber is heated by the heating device 76. At this juncture, the hydrophilic processing liquid on the fiber surface is dried and evaporated to reform the fiber surface to provide hydrophilic function. Then, the fiber, the surface of which is reformed, is roughly drawn by a roller group 77, and then, contained in the can 78. After that, as shown in FIG. 8B, fibers are altogether drawn from a plurality of cans 78 by means of rollers 79 again and immersed in hydrophilic processing liquid 74 in the processing tub 80, and then, crimped by the crimping machine 81 after passing the heating device 84. After that, in accordance with the mode of use, tow 83 is formed or those cut from the tow 83 (not shown) are formed. Here, the heating device 84 dries and evaporates hydrophilic processing liquid on the fiber surface by heating in the same manner as the heating device 76, thus reforming the fiber surface to provide hydrophilic function. If the heating device 76 is not installed, this device is needed for the surface reformation process, but if the former is installed, this one is not needed. In other words, it is good enough if either the heating device 76 or the heating device 84 is in operation or installed in the manufacturing process shown in FIGS. 8A and 8B. Here, the hydrophilic processing liquid demonstrates an antistatic effect, too.

Figure 9:
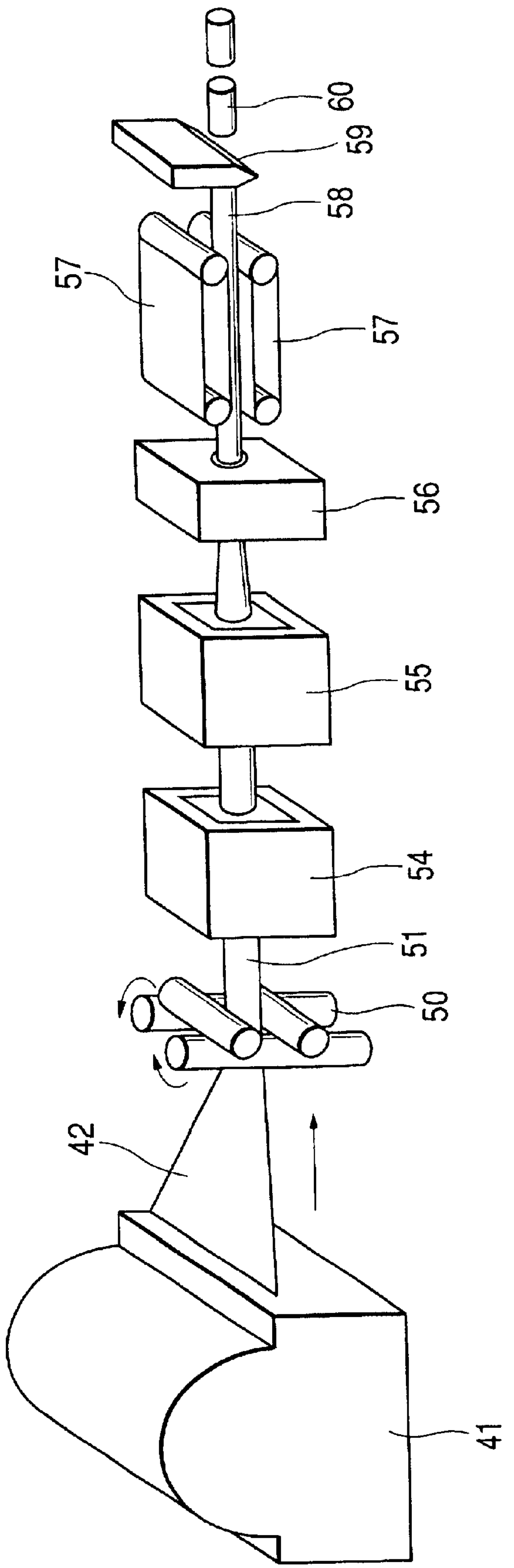
FIG. 9 is a view which shows the example in which a fiber aggregate that becomes an ink absorber capable of generating negative pressure optimal to an ink jet recording apparatus is manufactured from the tow formed by short fiber obtainable by use of the apparatus shown in FIGS. 8A and 8B.

Next, with reference to FIG. 9, the description will be made of the example in which the fiber aggregate that becomes an ink absorber capable of generating negative pressure optimally for an ink jet recording apparatus is manufactured from a cut tow 83. In FIG. 9, however, the same reference marks are applied to the same structures as those appearing in the first embodiment, and the detailed description thereof will be omitted.

In FIG. 9, the cut tow 83 is carried by means of air drafting to enable it to pass the cotton comber 41. Then, after processing it to be a sheet web 42 having stabilized unit weight, the web 42 is bundled by a set of rollers 50 for the manufacture of sliver 51, namely, short fiber aggregate. The sliver 51 is processed by use of the same devices as those shown in FIG. 2 so as to manufacture the fiber aggregate 60 which is preferably usable as an ink absorber for an ink jet recording apparatus. The fiber aggregate 60 thus manufactured demonstrates the same effect as the first embodiment. Particularly, the fiber surface is given the reforming process in the stage of being fiber. Therefore, as compared with the case where the surface reforming process is executed when fiber aggregate is made, it becomes possible to uniformalize the reformed property more evenly on the surface and inner surface areas of the fiber aggregate after having been manufactured. The structure of fiber aggregate is also equal to the one described earlier in conjunction with FIGS. 5A to 5D and FIG. 6.

In this respect, as the ink absorber of an ink tank used for an ink jet recording apparatus, felt or the like may be utilized, besides the absorber manufactured by use of the devices shown in FIG. 2. Here, it is needless to mention that the tow, which is given hydrophilic process by the aforesaid method, is usable as the material of felt. Also, in accordance with the aforesaid embodiment, the surface of the fiber aggregate has cut section and non-cut section due to the adopted method of manufacture, but it is possible to form an absolvent without providing the cut section and non-cut section by use of a method in which, for example, the long hydrophilic fiber is inserted into a mold as it is, and then, the mold is heated to manufacture the fiber absolvent.

Now, the first and second embodiments described above both comprise a process to dip the fiber absolvent formed by fiber having olefine resin at least on the surface layer thereof into the processing liquid with hydrophilic group that contain polyalkylsiloxane, acid, and alcohol; a process to condense and evaporate the processing liquid adhering to the fiber surface subsequent to the dipping process; and a process to form a fiber absolvent by heating the fiber having hydrophilic surface to thermally bond the contact points of fibers themselves. In this way, it is possible to obtain the fiber absorber provided with the hydrophilic property which is uniformalized still more. Here, the hydrophilic processing (lyophilic processing) method is not necessarily limited to the aforesaid processing liquid. It may be possible to reform the surface to the one that has hydrophilic property in such a manner that the polymer, which is provided with a first portion having hydrophilic group as a functional group, and a second portion having interfacial energy different from that of the functional group, but substantially equal to the surface energy of the fiber formed by olefine resin functioning as the element serving as a target adhesion (the details will be described in the other embodiment), is processed to enable the second portion to be orientated to the fiber surface in advance, while the first portion is orientated to the side different from the surface. The surface reformation mechanism of the kind will be also described in the other embodiment.

Also, the target fiber is not necessarily limited to the aforesaid olefine resin. The fiber which has some other synthetic resin as the material thereof or natural fiber may be used if only the aforesaid surface reformation is possible before being formed as an absolvent. Nevertheless, it is more desirable to use the thermoplastic resin that can be fused on the intersecting points of fibers themselves by heating when the aforesaid second portion of the polymer is orientated on the fiber surface by utilization of heating, because the process to fuse the intersecting points of fibers themselves and the process to make the surface reformation can be executed at a time. In this respect, if heating is used to form fiber aggregate, the formation process of the fiber aggregate and the aforesaid surface reforming process can be executed at a time irrespective of the kind of fiber even if the contact points of fibers are not thermally fused by heating.

Third Embodiment

The fiber aggregate manufactured as described above has cut section and non-cut section on the surface of fiber aggregate due to the method of manufacture, and the characteristics are different with respect to liquid by the cut section and non-cut section. In other words, the non-cut section is formed mostly by the hydrophilic processed fiber surface and presents hydrophilic property as shown in FIG. 6. However, the cut section is mostly formed by the section of biaxially structured synthetic fiber of PP and PE, and the wettability is unfavorable (the contact angle of PP and PE to water is 80° or more).

Figure 10B:
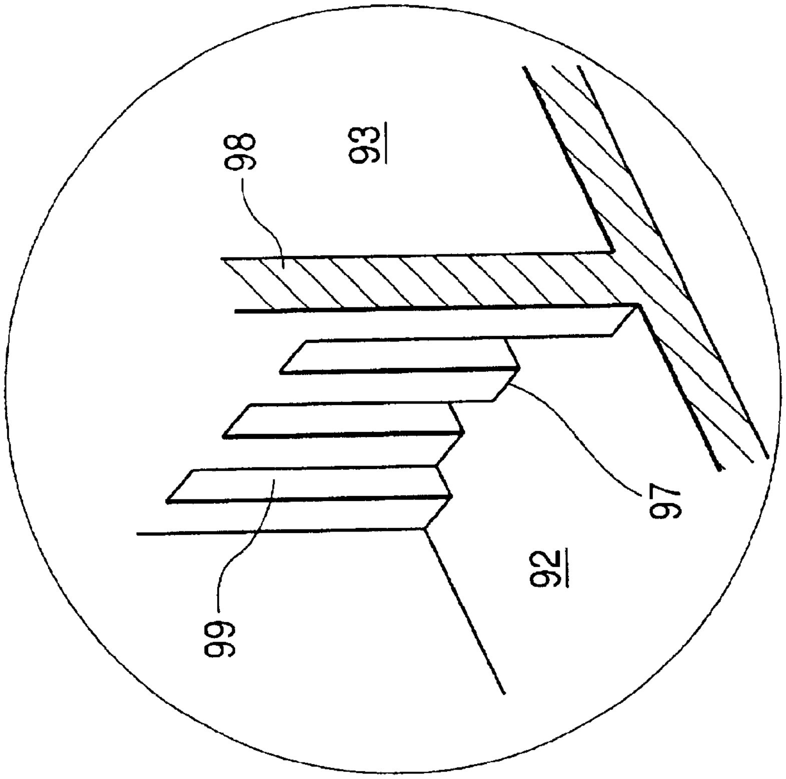
FIGS. 10A and 10B are cross-sectional views which schematically illustrate an ink tank for use of an ink jet apparatus, which is suitable for the fiber aggregate obtained by the method of manufacture embodying the present invention.
Figure 10A:
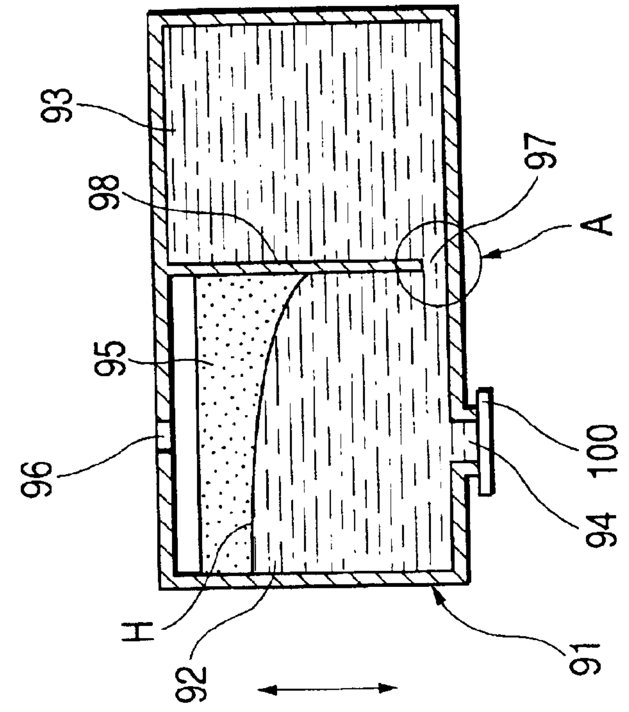

Here, therefore, the description will be made of an example to utilize the characteristics of the method for manufacturing fiber aggregate as described above. FIGS. 10A and 10B are cross-sectional views which schematically illustrate an ink tank used for an ink jet apparatus preferably applicable to the fiber aggregate obtainable by the method of manufacture of the present invention. In FIGS. 10A and 10B, ink itself and ink retained by fiber element are indicated by dotted horizontal lines. The fiber itself that has no ink is indicated by dots.

The ink tank 91 of the mode shown in FIGS. 10A and 10B is formed by a negative pressure generating member containing chamber (first chamber) 92 and an ink containing chamber (second chamber) 93.

The negative pressure generating member containing chamber 92 is provided with a housing having an ink supply port 94 for supplying ink (including processing liquid or the like) to the outside, such as an ink jet head for recording by discharging liquid from discharge ports, and the fiber aggregate (ink absolvent) 95 serving as the negative pressure generating member that generates negative pressure with respect to the ink jet head. The fiber aggregate 95 is manufactured by the method of manufacture embodying the present invention as described above, and the fiber surface is given hydrophilic process. For the fiber aggregate 95, the main fiber direction is essentially orientated perpendicular to the vertical direction. The aforesaid housing is further provided with an atmospheric communication port 96 for the fabric aggregate 95 contained inside to be communicated with the air outside. The ink supply port 94 may be open in advance or closed by a seal 100 initially, and opened when used by removing the seal 100.

On the other hand, the ink containing chamber 93 contains ink inside directly, while being provided with an ink outlet port 97 near the bottom face for leading out liquid to the negative pressure generating member containing chamber 92. On the face of the partition wall 98 between the chambers 92 and 93 on the negative pressure generating member containing chamber 92 side, which is provided with ink outlet port 97, the atmosphere inlet groove 99 is extend from a designated height of the partition wall 98 to the ink outlet port 97, which promotes gas-liquid exchange to be described later.

Here, the function of the atmosphere inlet groove 99 will be described. In FIGS. 10A and 10B, when ink is consumed by an ink jet head (not shown) through the ink supply port 94, the liquid level H is lowered in the fiber aggregate 95 of the negative pressure generating member containing chamber 92. With further consumption of ink through the ink supply port 94, the air is induced into the ink containing chamber 93. In other words, the air enters the ink containing chamber 93 from the atmospheric communication port 96 by way of the atmosphere communication groove 99, and the ink outlet port 97. Consequently, being replaced by the air, ink moves from the ink containing chamber 93 to the fiber aggregate 95 of the negative pressure generating member containing chamber 92. At this time, the liquid level H in the fiber aggregate 95 is stabilized at the height of the upper end of the atmosphere inlet groove 99. Therefore, if ink is consumed by the ink jet head, ink is filled in the fiber aggregate 95 in accordance with the amount of such consumption, and the fiber aggregate 95 maintains the liquid level H stably to keep the negative pressure substantially constant. In this way, the ink supply to the ink jet head is stabilized.

Here, with the arrangement of the main fiber direction of the fiber aggregate 95 to be essentially perpendicular to the vertical direction, the gas-liquid interface in the fiber aggregate is made to be essentially parallel to the main fiber direction. Thus, even when the gas-liquid interface should change due to the environmental changes, the gas-liquid interface maintains the horizontal direction substantially (the direction substantially at right angles to the vertical direction), hence making it possible to suppress variation of the gas-liquid interface with respect to the vertical direction in accordance with the cycle number of environmental changes.

Moreover, the fiber surface that forms the fiber aggregate (ink absolvent) 95 in the negative pressure chamber 92 is made hydrophilic, and the main fiber direction of the fiber aggregate 95 is in the horizontal direction. Therefore, it becomes easier to make the liquid level constant when ink jet recording is suspended or at rest, while securing the excellent capability of supply to the head (high flow-rate supply and high speed replenishment) by the reduction of flow resistance and the enhancement of wettability by the presence of hydrophilic group. Thus, it becomes possible to secure the stabilized generation of negative pressure, because the capability of retaining and distributing ink is made extremely even.

Figure 11A:
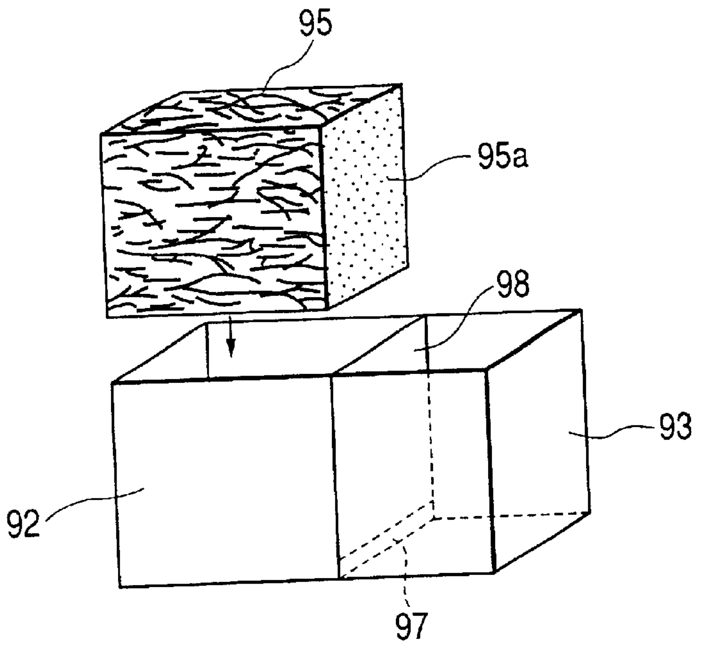
FIGS. 11A and 11B are views which illustrate the direction in which the ink absorber (fiber aggregate) is contained in the ink tank shown in FIGS. 10A and 10B and the contained condition thereof as well.
Figure 11B:
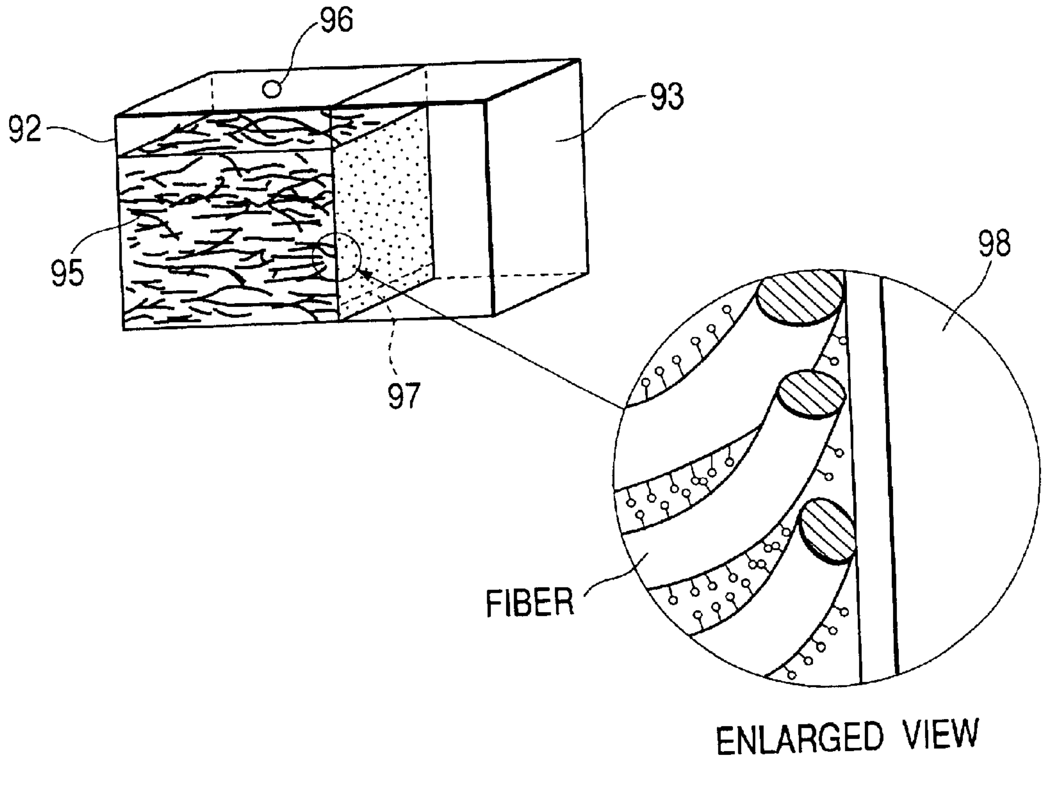

The fiber aggregate 95 in the negative pressure generating member containing chamber 92 of an ink tank 91 of the kind is contained therein utilizing the characteristics thereof. FIGS. 11A and 11B are views which illustrate the direction of the ink absolvent (fiber aggregate) being contained in the ink tank shown in FIGS. 10A and 10B, as well as the condition thereof.

In other words, as shown in FIG. 11A, the fiber aggregate 95 is contained in the negative pressure generating member containing chamber 92 so as to enable the cut section 95*a* of the fiber aggregate 95 to face the partition wall 98. At this time, the cut section of the fiber aggregate 95 having unfavorable wettability (having water-repellent property) is in contact with the partition wall 98 on the negative pressure generating member containing chamber 92 side, hence making it difficult for the liquid to attach thereto. For that matter, flow resistance is made comparatively small against the air flowing to the atmosphere inlet groove and ink outlet port 97 when the aforesaid gas-liquid exchange occurs. The gas-liquid exchange is executable instantaneously. Therefore, even if a large amount of ink should be consumed by an ink jet head for the execution of high speed printing when the gas-liquid exchange is being made, it is possible to make a supply of high flow rate from the ink containing chamber 93 to the negative pressure generating member containing chamber 92.

Further, if the cut section 95*a* of the fiber aggregate 95 is in a state of being in contact with the partition wall 98 firmly when the fiber aggregate 95 is contained in the negative pressure generating member containing chamber 92, the fiber cut section of the cut section 95*a* of the fiber aggregate 95 is directed upward to the upper part of the container along the partition wall 98 as shown in the enlarged figure in FIG. 11B. In this posture, it becomes easier to induce the air into the ink outlet port 97 on the lower part of the container from the upper part of the container at the time of gas-liquid exchange as compared with the case where the fiber cut section is simply in contact with the partition wall 98, and then, to quickly absorb the ink, which is drawn out from the ink outlet port 97 on the lower part of the container, into the fiber aggregate 95.

Fourth Embodiment

Figure 12:
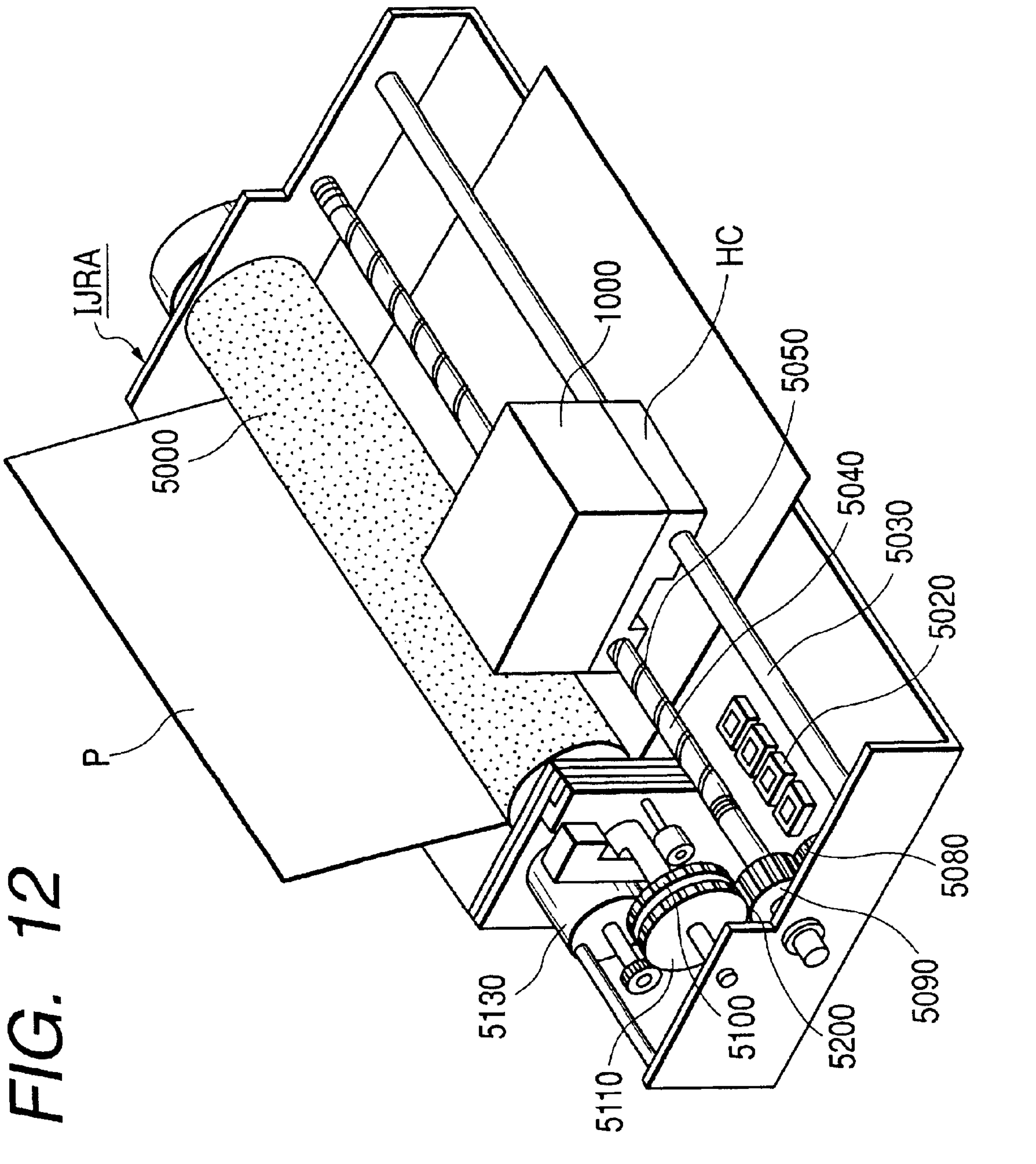
FIG. 12 is a perspective view which schematically shows a liquid discharge apparatus in accordance with a fourth embodiment of the present invention.

Next, with reference to FIG. 12, the description will be made of a liquid discharge recording apparatus that records with a recording liquid container mounted thereon. FIG. 12 is a view which schematically shows a liquid discharge recording apparatus in accordance with a fourth embodiment of the present invention.

In FIG. 12, a liquid container 1000 is fixedly supported on the main body of a liquid discharge recording apparatus IJRA by positioning means (not shown) of a carriage HC, while each container being detachably installed on the carriage HC. The recording head (not shown) for discharging recording liquid may be installed on the carriage HC in advance or provided for the ink supply port of the liquid container 1000 in advance. As the liquid container 1000, the container described in the third embodiment is applicable, for example.

The regular and reverse rotations of a driving motor 5130 is transmitted to a lead screw 5040 through driving power transmission gears 5110, 5100, and 5090 to rotate the lead screw. Also, the carriage HC, which engages with the spiral groove 5050 of the lead screw 5040, can reciprocate along a guide shaft 5030.

A reference numeral 5020 designates a cap that covers the front face of the recording head. The cap 5020 is used for executing the suction recovery of the recording head by use of suction means (not shown) through the inner opening of the cap. The cap 5020 moves by the driving power transmitted through gears 5080, 5090, and others to cover the discharge port surface of each of the recording heads. In the vicinity of the cap 5020, a cleaning blade (not shown) is arranged. The blade is supported movable in the up and down direction in FIG. 12. The blade is not necessarily limited to this mode. The known blade is of course applicable to the present embodiment.

Here, the structure is arranged so as to operate capping, cleaning, and suction recovery as desired in the corresponding positions by the function of the lead screw 5040 when the carriage HC moves to the home position. The structure is not necessarily limited thereto. If only a desired operation is executable at a known timing, the structure that may be arranged in any way is applicable to the present invention.

Of the ink jet recording methods, the present invention demonstrates excellent effects on the one that utilizes thermal energy to form flying droplets for recording in particular.

For the typical structure and operational principle of such method, it is preferable to adopt those implemental by the application of the fundamental principle disclosed in the specifications of U.S. Pat. Nos. 4,723,129 and 4,740,796, for example. This method is applicable to the so-called on-demand type recording and a continuous type recording as well. Here, in particular, with the application of at least one driving signal that corresponds to recording information, the on-demand type provides an abrupt temperature rise beyond nuclear boiling by each of the electrothermal converting members arranged corresponding to a sheet or a liquid path where liquid (ink) is retained. Then, thermal energy is generated by the electrothermal converting member, hence creating film boiling on the thermal activation surface of recording head to effectively form resultant bubble in liquid (ink) one to one corresponding to each driving signal. Then, by the growth and shrinkage of bubble, liquid (ink) is discharged through each of the discharge openings, hence forming at least one droplet. The driving signal is more preferably in the form of pulses because the growth and shrinkage of bubble can be made instantaneously and appropriately so as to attain the performance of excellent discharge of liquid (ink), in particular, in terms of the response action thereof.

The driving signal given in the form of pulses is preferably such as disclosed in the specifications of U.S. Pat. Nos. 4,463,359 and 4,345,262. In this respect, the temperature increasing rate of the thermoactive surface is preferably such as disclosed in the specification of U.S. Pat. No. 4,313,124 for the excellent recording in a better condition.

As the structure of the recording head, there are included in the present invention, the structure such as disclosed in the specifications of U.S. Pat. Nos. 4,558,333 and 4,459,600 in which the thermal activation portions are arranged in a curved area, besides those which are shown in each of the above-mentioned specifications wherein the structure is arranged to combine the discharging openings, liquid paths, and the electrothermal transducing members (linear type liquid path or right-angled liquid path).

In addition, the present invention is effectively applicable to the structure disclosed in Japanese Patent Application Laid-Open No. 59-123670 wherein a common slit is used as the discharging openings for plural electrothermal transducing devices, and to the structure disclosed in Japanese Patent Application Laid-Open No. 59-138461 wherein an aperture for absorbing pressure waves of thermal energy is formed corresponding to the discharge openings.

Further, the present invention can be utilized effectively for the full-line type recording head the length of which corresponds to the maximum width of a recording medium recordable by such recording apparatus. For the full-line type recording head, it may be possible to adopt either a structure whereby to satisfy the required length by combining a plurality of recording heads or a structure arranged by one integrally formed recording head.

In addition, the present invention is effectively applicable to the freely exchangeable chip type recording head, for which electrical contact with the apparatus main body and ink supply form the apparatus main body are made possible when installed on the apparatus main body or to the cartridge type recording head having ink tanks integrally formed with the recording head itself.

Also, for the present invention, it is preferable to additionally provide a recording head with recovery means and preliminarily auxiliary means as constituents of the recording apparatus, because these additional means contribute to making the effectiveness of the present invention more stabilized. To name them specifically, these are capping means, cleaning means, suction or compression means, pre-heating means such as electrothermal converting members or heating elements other than such converting members or the combination of those types thereof. Here, also, the performance of a pre-discharge mode whereby to make discharge other than the regular discharge is effective for the execution of stable recording.

Further, the present invention is extremely effective in applying it not only to a recording mode in which only main color such as black is used, but also to an apparatus having at least one of multi-color modes with ink of different colors, or a full-color mode using the mixture of colors, irrespective of whether the recording heads are integrally structured or it is structured by a combination of plural recording heads.

In the embodiments of the present invention described above, ink has been described as liquid. However, the ink thus referred to therein may be an ink material which is solidified below the room temperature but soften or liquefied at the room temperature. Here, also, since ink is generally controlled for the aforesaid ink jet method to be within the temperature not lower than 30° C. and not higher than 70° C. to stabilize its viscosity for the execution of stable discharges, the ink may be such as to be liquefied when the applicable recording signals are given.

In addition, it may be possible to use ink which is liquefied only by the application of thermal energy, but solidified when left intact in order to positively prevent the temperature from rising due to the thermal energy by use of such energy as the energy which should be consumed for changing states of ink from solid to liquid, or consumed for the prevention of ink from being evaporated. In either case, for the present invention, it may be possible to adopt the use of ink having a nature of being liquefied only by the application of thermal energy, such as ink capable of being discharged as ink liquid by enabling itself to be liquefied anyway when the thermal energy is given in accordance with recording signals or to adopt the use of the ink which will have already begun solidifying itself by the time it reaches a recording medium. For the present invention, the most effective method that uses the various kinds of ink mentioned above is the one which is capable of implementing the film boiling method as described above.

Moreover, as the mode of the recording apparatus in accordance with the present invention, it may be possible to adopt a copying apparatus combined with a reader, in addition to the image output terminal for a computer or other information processing apparatus, and also, it may be possible to adopt a mode of a facsimile equipment having transmitting and receiving functions.

In this respect, as the recording head, it may be possible to use the one that adopts a method utilizing piezoelectric element, besides the method described above.

Other Embodiment

The description will be made further in detail of a hydrophilic processing method for the fiber surface of fiber aggregate usable for the negative pressure generating member (ink absolvent) of a liquid container described above.

At first, the principle of the surface reforming of an element, which is applicable to the hydrophilic processing of the fiber that forms the absolvent, will be described more specifically.

The surface reforming method to be described below can implement the intended surface reforming in such a way that by the utilization of the functional group or the like possessed by molecule contained in the substance that forms the surface of an element, polymer (or polymeric granulates) is orientated specifically to enable it to adhere to the surface, and then, the associated property of the group possessed by the aforesaid polymer (or polymeric granulates) is provided for the surface.

Here, the term “element” means the element formed by various kinds of materials to keep a specific external form. Thus, accompanying this external form, the element has the outer surface externally exposed. In addition, there may be present internally the space, cavity, or hollow that contains a portion externally communicated, and the inner surface (inner wall face) that partitions such portion can be arranged to be an element for the surface reforming processing. The hollow portion may include the one which is provided with the inner surface that partitions itself to become a space completely insulated from the external portion. Such hollow can also be a target element of this process if it is possible to give a surface processing solution into the hollow portion before giving the intended reforming process, and to make the hollow portion insulated from outside after processing.

As described above, the surface reforming method of the present invention is applicable to the surface, among all the surfaces of various kinds of elements, which allows a liquid type surface processing solution to be contact therewith from outside without spoiling the shape of the target element. Therefore, the outer surface of an element and the inner surface communicated therewith are assumed to be targets of this processing. Then, it is included in the scope of the present invention to change the property of the surface of a portion selective from the surface of the target element. Depending on the way of selection, the mode of selection of the outer surface of an element and the inner surface communicated therewith is included in the reformation of the surface area of a desired portion.

With this surface reforming method, processing is given to the reforming portion (a partial surface) that structures at least a part of the surface possessed by an element. In other words, the target can be a part selected from the surface of an element or the entire surface thereof as desired.

Also, the term “polymeric granulates” means either those partly dissociated from polymer or monomer. In the sense of embodiment, however, such part is assumed to include all the formation thereof when polymer is cleaved by acid. Also, the expression “polymeric filming” includes the formation of an essential film, and also, the film each part of which may present different orientation on the two-dimensional surface.

Also, in the specification hereof, the term “polymer” means the one that has a first portion having a functional group, and a second group having the interfacial energy different from that of the functional group, but substantially equal to the surface energy of the element of target adhesion, which should preferably be different from the structural material of the surface of the aforesaid element. Therefore, it should be good enough if only a desired polymer is selected appropriately from polymer having the interfacial energy substantially equal to the surface energy of an element in accordance with the structural material of the element to be reformed. More preferably, “polymer” is such that it can be cleaved, and that after cleavage, it can be condensed desirably. Also, polymer may be provided with functional group besides the aforesaid first and second portions. In such case, however, it is desirable, taking a hydrophilic processing as an example, that the hydrophilic group that serves as the functional group should present relatively long chain with respect to the functional group other than the first and second portions (which becomes a group of relatively hydrophobic against the aforesaid hydrophilic group).

Principle of Surface Reformation to be Conducted

For the surface reformation of an element applicable to the present invention, the polymer, which is formed by binding the main skeleton (collectively calling main chain or side chain group, or groups) having a surface energy substantially equal to the surface (interfacial) energy of the surface of an element (surface of basis), and a group having surface energy different from the surface (interfacial) energy of the surface of an element, is utilized to enable the polymer to adhere to the surface of the element by use of the main skeleton portion having the surface energy substantially equal to the interfacial energy of the surface of the element in the surface reforming agent, and to enable the group having the surface energy different from the interfacial energy of the surface of the element to form a polymeric film (polymeric cover) orientated to the outer side with respect to the surface of the element for the attainment of this reformation.

In other words, from the different point of view regarding the polymer used for the aforesaid surface reforming agent, it may be possible to grasp this polymer as the one which is provided with a second group the affinity of which is essentially different from that of the group exposed on the surface of an element before surface reformation, and a first group which presents the affinity essentially similar to that of the group exposed on the surface of the element, which is contained in the repeating unit of the main skeleton thereof.

Figure 13A:
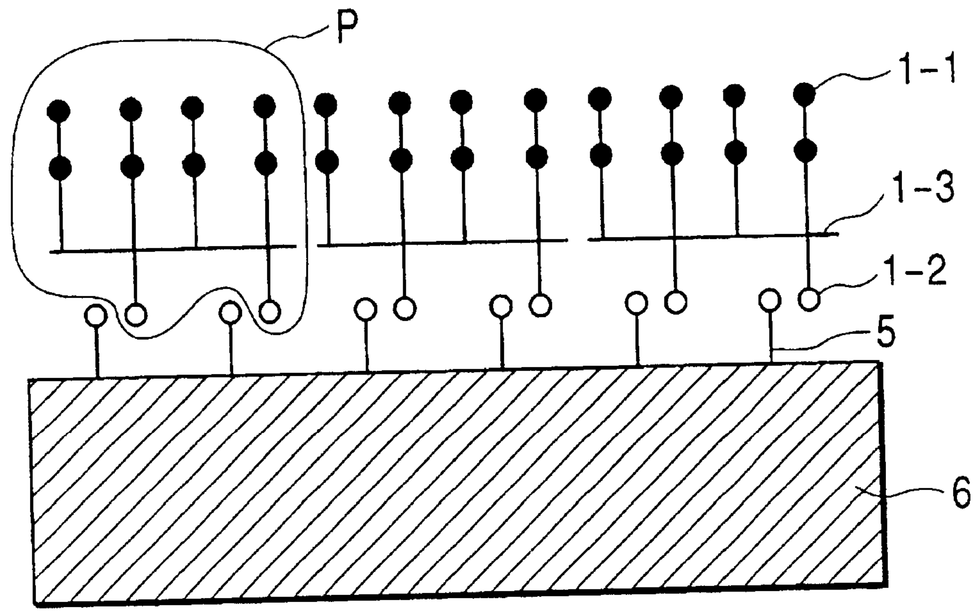
FIGS. 13A and 13B are views which schematically illustrate the adhesive mode of the polymer of a surface reforming agent formed on the reforming surface of an object (element) and the surface of such element in the surface reforming method applicable to the present invention.
Figure 13B:
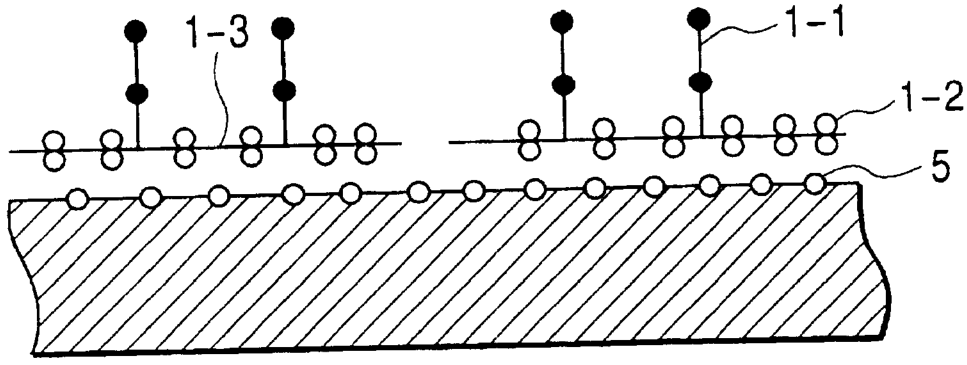

FIGS. 13A and 13B are views which schematically illustrate the typical example of such mode of orientation. FIG. 13A is a view which shows a case of using the polymer in which a first group 1-1 and a second group 1-2 are bound as the side chain with respect to the main chain 1-3. FIG. 13B is a view which shows a case where the second group 1-2 forms the main chain 1-3 itself, and the first group 1-1 forms the side chain.

Figure 29:
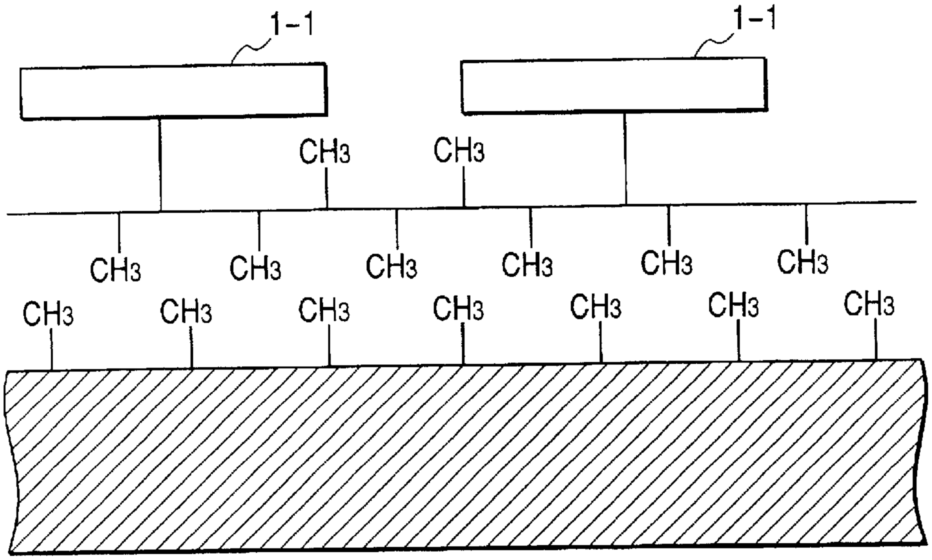
FIG. 29 is a view which schematically shows one example of the estimated distribution of the hydrophilic group and hydrophobic group on the surface given the surface reformation processing applicable to the present invention.

Taken the orientations shown in FIGS. 13A and 13B, the outermost surface (outer side) of the basis 6 that forms the surface of an element, which must be reformed, presents the state where the group 1-1 having the surface energy different from the surface (interfacial) energy of the basis 6 is orientated on the surface. As a result, the surface is reformed utilizing the accompanying property of the group 1-1 having the surface energy different from the surface (interfacial) energy of the basis 6. Here, the surface (interfacial) energy of the basis 6 is originated and determined by the group 5 on the surface of which the substance or molecule that forms the surface is exposed. In other words, the first group 1-1 acts as the functional group for use of the surface reformation in the example shown in FIGS. 13A and 13B, and if the surface of the basis 6 is hydrophobic and the first group 1-1 is hydrophilic, a hydrophilic property is provided for the surface of the basis 6. In this respect, if the first group 1-1 is hydrophilic and the group 5 on the basis 6 side is hydrophobic, the state as shown in FIG. 29 is considered to be present when, for example, polysiloxane is utilized as described later. In this state, with the adjustment of balance between the hydrophilic group and hydrophobic group on the surface of the basis 6 after reforming process having been given, it may be possible to adjust the passing condition or the flow rate at the time of passage, too, when water or an aqueous liquid having water as its main component passes the surface of the basis 6 after reforming process has been given. Conceivably, then, it becomes possible to effectively perform filling ink in an ink tank or supplying ink from the ink tank to a head in an excellent condition if such surface condition is established in the ink tank formed integrally with an ink jet recording head by fabric element of polyorefine, for example, which provides a fibrous outer wall face or such ink tank arranged as a separate component, while securing an appropriate negative pressure in the ink tank, hence securing the position of ink interface (meniscus) in good condition in the vicinity of discharge port of a recording head immediately after ink discharge. In this way, it becomes possible to provide an element best suited for a negative generating member, in which static negative pressure is greater than dynamic negative pressure, for retaining ink to be supplied to an ink jet recording head.

Here, particularly, in the case of the fiber surface structure shown in FIG. 29, the hydrophilic group 1-1 is a polymeric group. Therefore, it has a longer structure than that of the methyl group (hydrophobic group) on the side chain on the same side. Consequently, when ink flows, the hydrophilic group 1-1 is inclined following the fiber surface corresponding to the flow rate (at the same time, covering the aforesaid methyl group essentially). Thus, the resultant flow resistance becomes considerably smaller. On the contrary, when the ink flow comes to a stop to form meniscus between fibers, the hydrophilic group 1-1 becomes perpendicular to the direction facing ink, that is, the vertical direction from the fiber surface (where the aforesaid methyl group is exposed on the fiber surface), making it possible to form the sufficient negative pressure that forms the balance within the molecular level of hydrophilic (large)—hydrophobic (small), and preferably make the function of the aforesaid hydrophilic property reliable, because this hydrophilic group 1-1 has a number of hydrophilic groups (at least in plural) as the previous embodiment in which many (—C—O—C—) bindings and OH group serving as end group are formed. Also, if the other hydrophobic member of the aforesaid methyl group is present in the polymer, it is preferable to make the range of existence of the hydrophilic group larger than that of the hydrophobic group so that the hydrophilic group 1-1 is set at a higher molecular level. As described above, it should be good enough if the balance between them becomes to be hydrophilic property>hydrophobic property.

Now, the static negative pressure in the ink supply port portion is expressed as the following formula.

Static negative pressure=(height from ink supply port portion to ink interface)−(capillary force of fiber at the ink interface)

The capillary force here is that given an angle of wet contact between ink and fiber absolvent as $\theta$, it is proportional to COS $\theta$. Therefore, depending on the presence or absence of the hydrophilic process of the present invention, the static negative pressure is made lower by the amount of change in COS $\theta$ if ink has large changes thereof, and in terms of the absolute value, it becomes possible to secure it higher.

More specifically, if the contact angle is at a level of 10°, the capillary force is increased up to 2% at the maximum even if the hydrophilic process is executed. However, if the combination of ink and fiber makes it difficult to present wettability, that is, the contact angle is conditioned to be 50°, for example, the 50% increase of capillary force may ensue if the contact angle is brought down to 10° or less (COS 0°/COS 10°≅1.02, COS 10°/COS 50°≅1.5).

Here, as a specific method for manufacturing an element having reformed surface shown in FIGS. 13A and 13B, the description will be made of a method for using an improver for the enhancement of wettability of processing agent, which is a good polymeric solvent and usable for the basis for surface reformation. This method is such that the processing liquid (surface reformation solution) for dissolving the polymer of surface reforming agent is coated uniformly on the surface of the basis, and then, the polymer of surface reforming agent contained in this processing liquid is orientated as described above, while removing the solvent contained in the processing liquid.

More specifically, a liquid having a specific amount of surface reforming agent and acid mixed therein (a surface processing liquid; if functional group is made preferable hydrophilic group, pure water should desirably be contained) is prepared in a good solvent for the surface reforming agent, which can be coated on the surface of basis sufficiently, and after the surface processing liquid is applied to the surface of the basis, a process is given to remove the solvent in the surface processing agent by evaporation and drying (in an oven at a temperature of 60° C., for example).

Here, from the viewpoint to make it easier to coat polymer used for surface reformation uniformly, it is more desirable to contain in the solvent the organic solvent that presents a sufficient wettability on the surface of basis, and that uniformly dissolves the polymer serving as the surface reforming agent. Further, there is an effect that when the concentration of polymer of the surface reforming agent becomes higher along the evaporation of solvent, such agent is dispersed uniformly in the coated liquid layer to provide the function hence keeping the sufficiently dissolved condition. In addition to such effect, it becomes possible to cover even the surface showing a complicated configuration uniformly, because the polymer of the surface reforming agent can be coated on the surface of basis widely and uniformly with the sufficient wettability of the surface processing liquid given to the basis.

Also, in addition to a first solvent having wettability on the surface of the basis, which is a good volatile solvent for polymer, the surface processing liquid may contain for use in combination a second solvent, which is also good solvent for polymer, but the wettability thereof is relatively inferior to the first solvent, and also, the volatility is relatively lower than that of the first solvent. As an example thereof, there is the combination of water and isopropyl alcohol to be described later when the reforming surface is formed by polyolefine resin using polyoxialkylene•polydimethylsiloxane as polymer, for example.

Here, conceivably, the effect obtainable by adding acid to the surface reforming liquid as cleaving catalyst is as follows: for example, when the concentration of acid component is increased along with the evaporation of used agent in the evaporation and drying process of the surface processing liquid, a highly concentrated acid with heat generation makes the orientation possible even to the finer portion of the surface of the basis by the creation of polymeric granulates by partial dissociation (cleavage) of polymer used for the surface reformation, and also, the resultant promotion is anticipated for the formation of polymeric film (polymeric cover or preferably monomeric film) through the polymerization of polymer in the surface reforming agent by rebinding cleaved portions of polymer themselves in the finishing process of evaporation and drying as another effect.

Also, when the concentration of the acid component is increased along the evaporation of the solvent in the evaporation and drying process of the surface processing liquid, the acid thus highly concentrated removes impure substance on the surface of the basis and near the surface thereof. As a result, it is anticipated that the surface of the basis is clearly formed. On the surface thus clearly formed, it is also anticipated that the physical power of adhesion is enhanced between the basic substance•molecule, and the polymer of the surface reforming agent, among some others.

At this juncture, the surface of the basis is partly decomposed by the highly concentrated acid accompanied by heating, and activated points appear on the surface of the basis. Then, active points appear on the surface of basis, and then, a secondary chemical reaction may take place to bind such active points and the granulates brought about by the aforesaid cleavage of polymer. Hence, as the case may be, the enhanced stabilization of adhesion of the surface reforming agent conceivably exists locally on the basis owing to such secondary chemical adsorption between the surface reforming agent and basis.

Next, with reference to FIG. 14 to FIG. 20, the description will be made of the polymer filming process by the dissociation of a main skeleton having the surface energy substantially equal to the surface energy of the basis of a surface reforming agent (containing a hydrophilic processing agent), and the condensation of the granulates on the surface of basis in accordance with the example in which the functional group is a hydrophilic group, and hydrophilic property is given to the surface of a hydrophobic group. In this respect, the hydrophilic group is formed to be capable of providing the hydrophilic property as a whole group. Here, it is possible to utilize as a hydrophilic group the hydrophilic group itself or even the one which possesses hydrophobic chain or hydrophobic group, but has the function to be able to provide hydrophilic property as a group when substitutionally arranged with hydrophilic group or the like.

Figure 14:
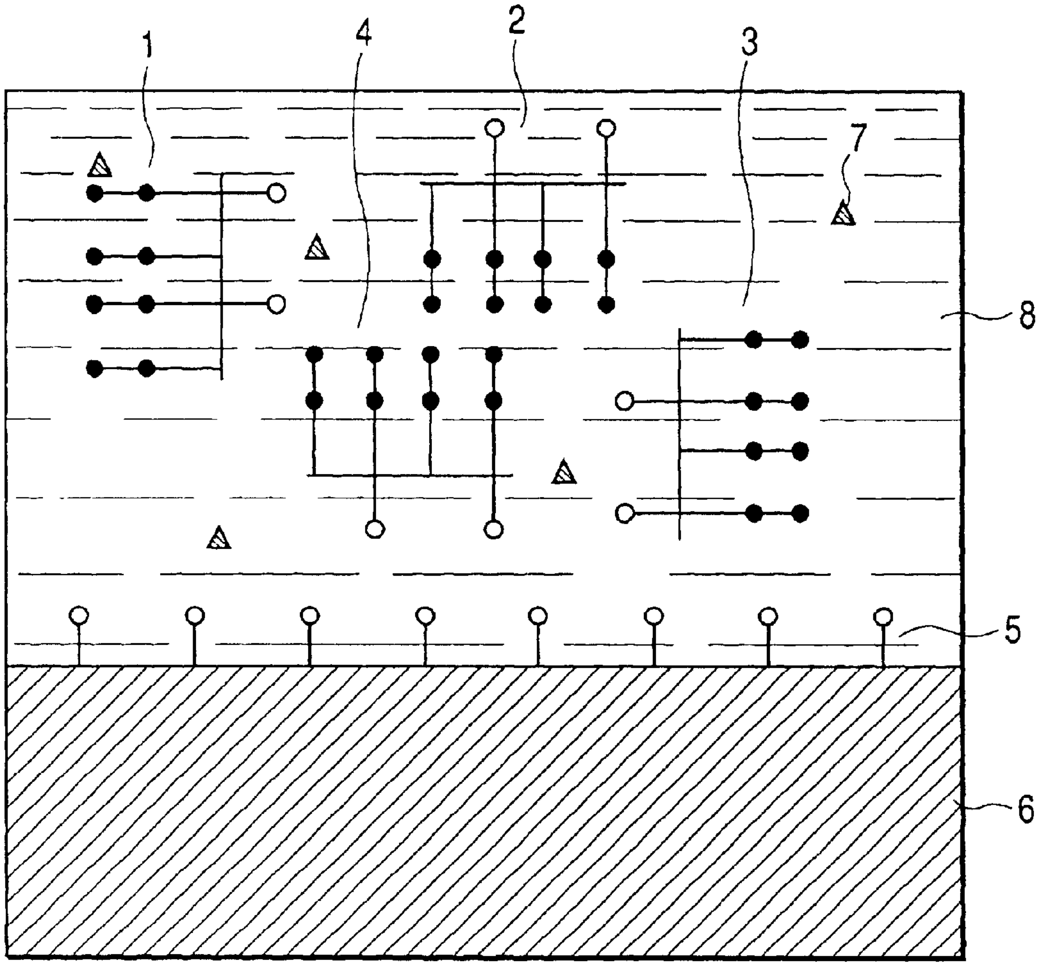
FIG. 14 is a view which schematically shows the state where the processing liquid that contains polymer of surface reforming agent is coated to form a coating layer on the element in accordance with the surface reforming method applicable to the present invention.
Figure 15:
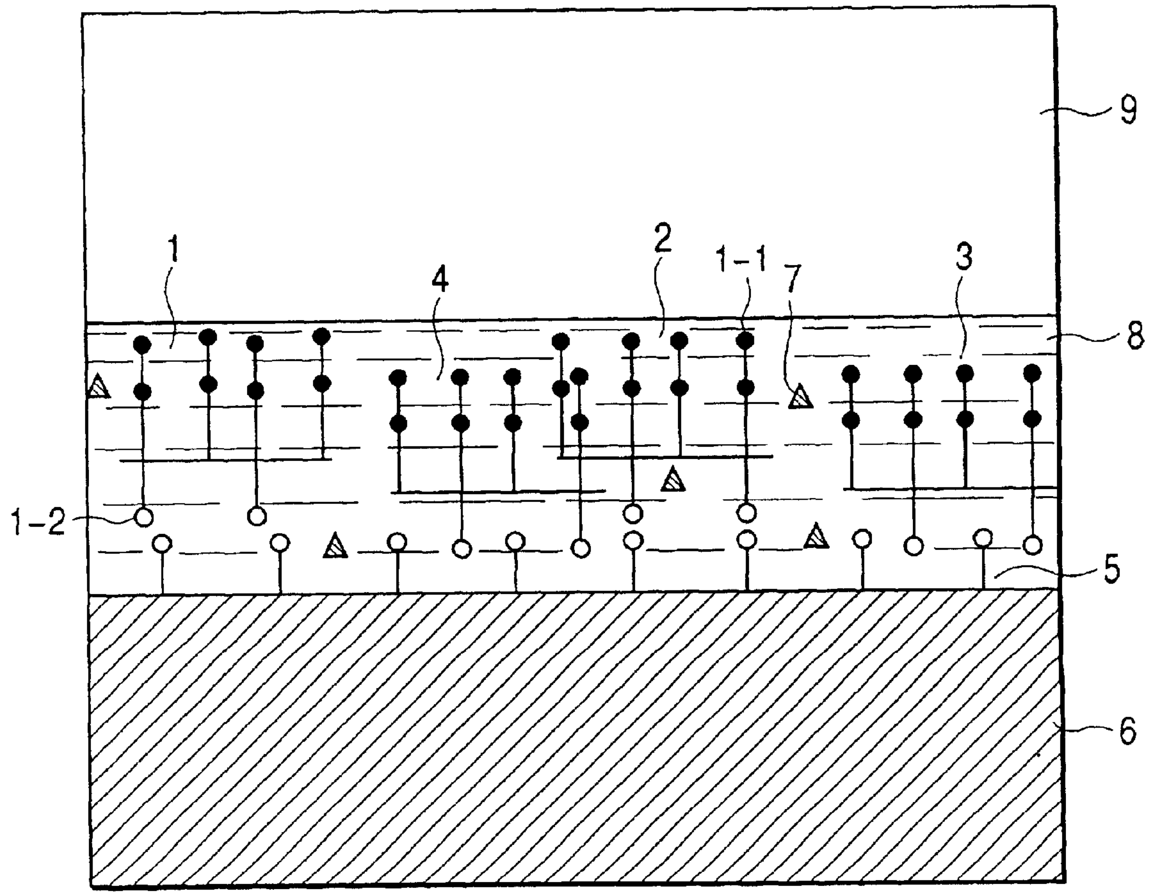
FIG. 15 is a conceptual view which shows a step of removing a part of solvent in the coating layer that contains polymer of surface reforming agent formed on an element in accordance with the surface reforming method applicable to the present invention.

FIG. 14 is an enlarged view which shows a state after a hydrophilic processing agent is coated. At this point, the polymer 1 to 4 and acid 7, which serve as hydrophilic processing agents contained in the hydrophilic processing liquid 8, are dissolved uniformly in the hydrophilic processing liquid on the surface of the basis 6. FIG. 15 is an enlarged view which shows a drying process subsequent to the coating of the hydrophilic processing agent. In drying accompanied by heating in the drying process subsequent to the coating of the hydrophilic processing agent, it is conceivable that the physical force of adsorption is enhanced for the basis 6 and the polymer 1 to 4 serving as the surface reforming agent by the clear surface of the basis 6 brought about by the rinsing action of the surface of the basis 6 when the impure substance that exists on the surface of the basis 6 and in the vicinity thereof is removed as the concentration of acid component increases along with the evaporation of solvent. Also, in drying accompanied by heating in the drying process subsequent to the coating of the hydrophilic processing agent, there conceivably exists the portion of the polymer 1 to 4 of the hydrophilic processing agent, the part of which is cleaved, when the concentration of acid component increases along with the evaporation of solvent.

Figure 16:
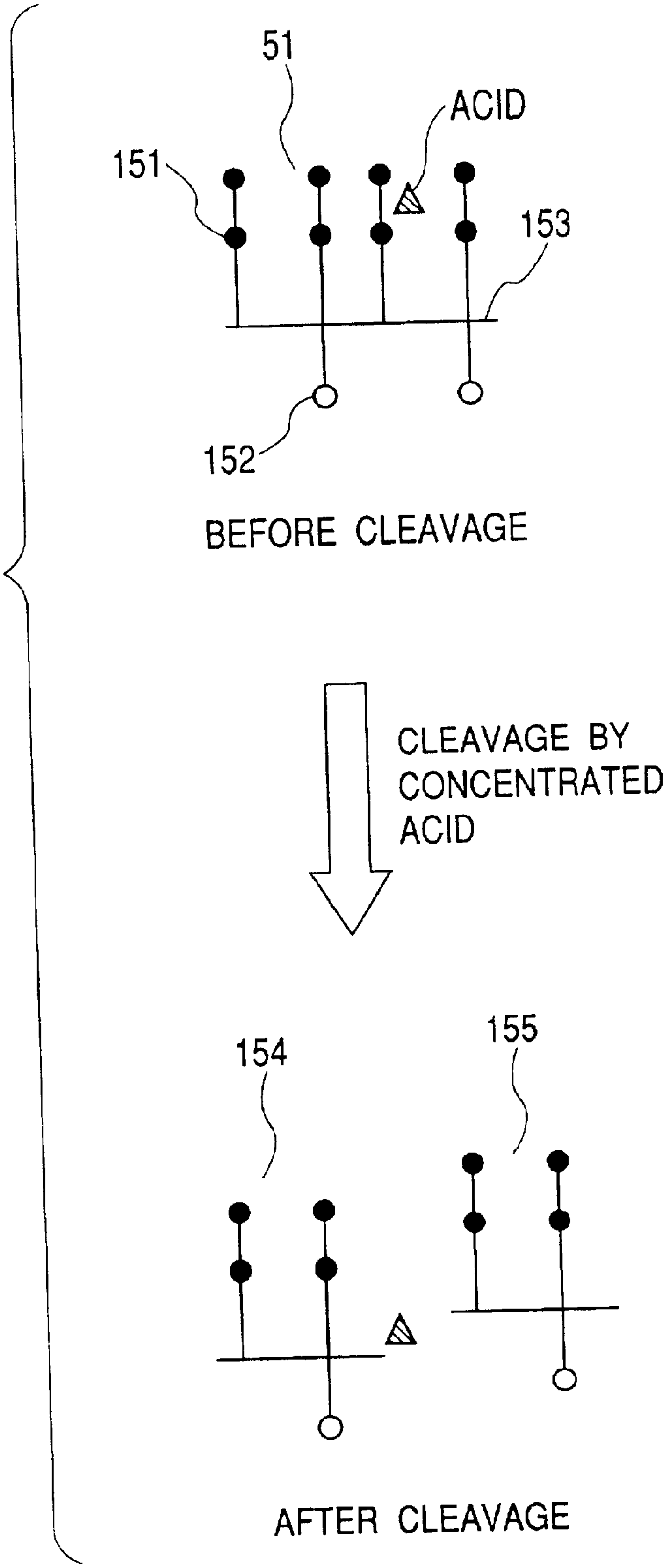
FIG. 16 is a conceptual view which shows the process in which the polymer of surface reforming agent is partially dissociated by the inducement of acid added to the processing liquid following the step of removing a part of solvent in the coating layer that contains the polymer of the surface reforming agent.
Figure 17:
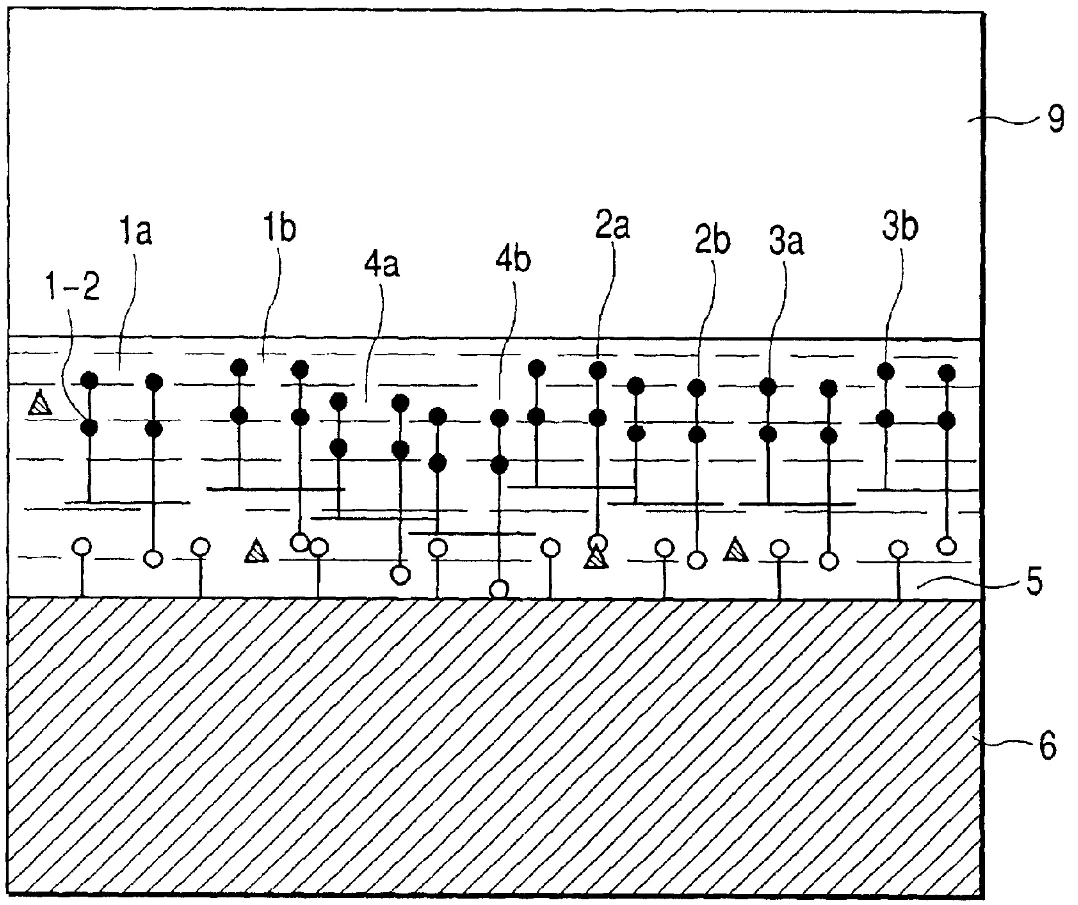
FIG. 17 is a conceptual view which shows the process in which the polymer of surface reforming agent or the dissociated granulates thereof are orientationally formed following the step of removing still more the solvent in the coating layer that contains the polymer of surface recording agent.

FIG. 16 is a view which schematically shows the decomposition of the polymer 1 by use of concentrated acid. FIG. 17 shows the state in which the hydrophilic processing agent thus decomposed is adsorbed to a basis. Further, with the advancement of solvent evaporation, the main skeleton portion of the granulates 1*a* to 4*b* of the polymer 1 to 4 that forms the hydrophilic processing agent arrives at the saturation of dissolution and present the surface energy substantially equal to the surface of energy of the basis. This portion is selectively adsorbed to the clear surface of the basis 6 which is formed by rinsing. As a result, the group 1-2 having the surface energy different from the surface energy of the basis 6 in the surface reforming agent is conceivably orientated to the outer side of the basis 6. In FIG. 16, a reference numeral 151 designates the first group; 152, the second group; 153, the main chain of the surface reforming again; 154, granulates 1; and 155, granulates 2.

Figure 18:
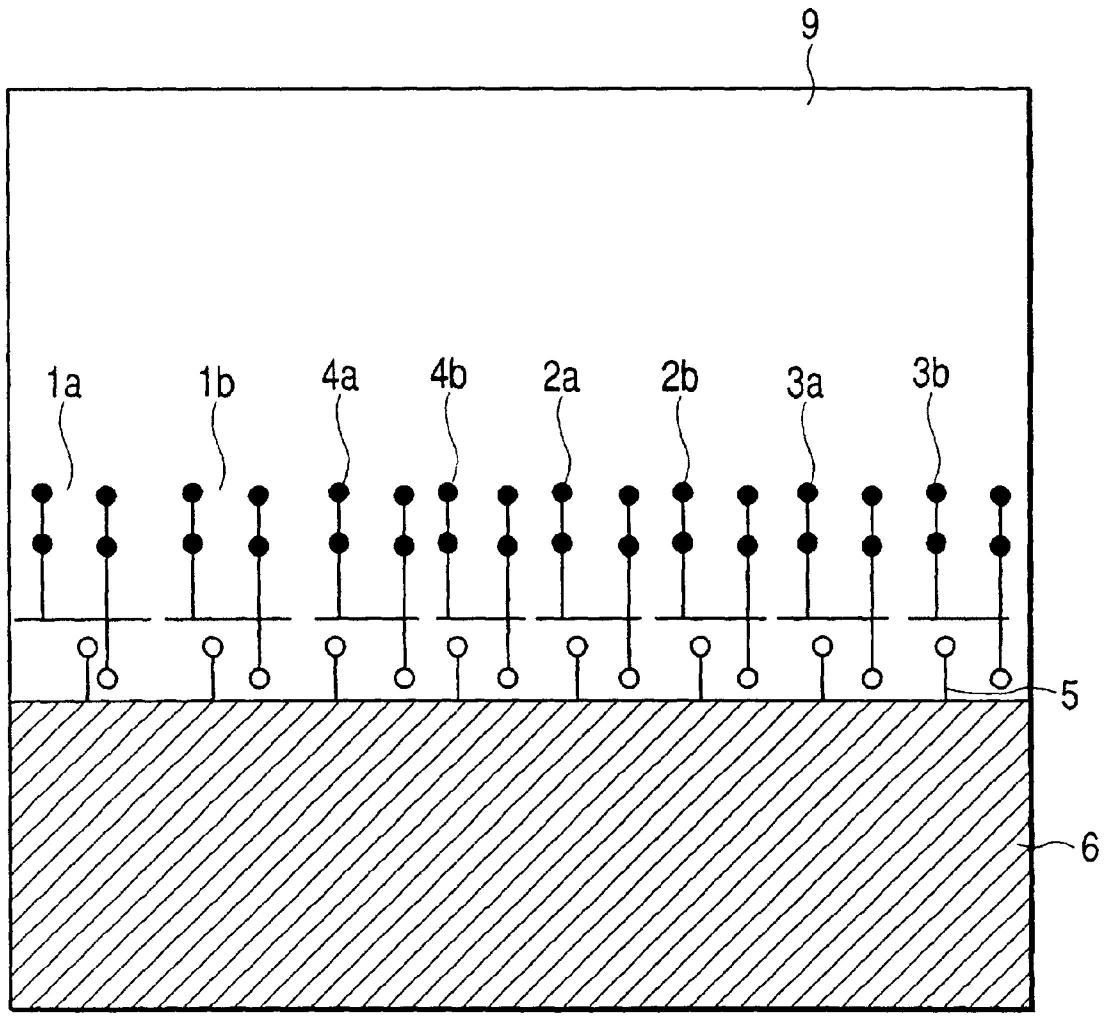
FIG. 18 is a conceptual view which shows the process in which the solvent in the coating layer is removed by drying, and the polymer of surface reforming agent or the dissociated granulates thereof are orientated and adhesively fixed on the surface.

Consequently, on the surface of the basis 6, the main skeleton portion having the surface (interfacial) energy substantially equal to the surface energy of this surface is orientated. Then, since the group 1-1 having the surface energy different from the surface energy of the basis 6 is in a state of being oriented to the outer side on the side opposite to the surface of the basis 6, a hydrophilic property is provided for the surface of the basis 6 if the group 1-1 is a hydrophilic group. The surface is reformed in this manner. FIG. 18 is a view which shows the state of the hydrophilic processing agent and the surface of the basis being adsorbed subsequent after the hydrophilic processing liquid has been coated and dried.

Figure 19:
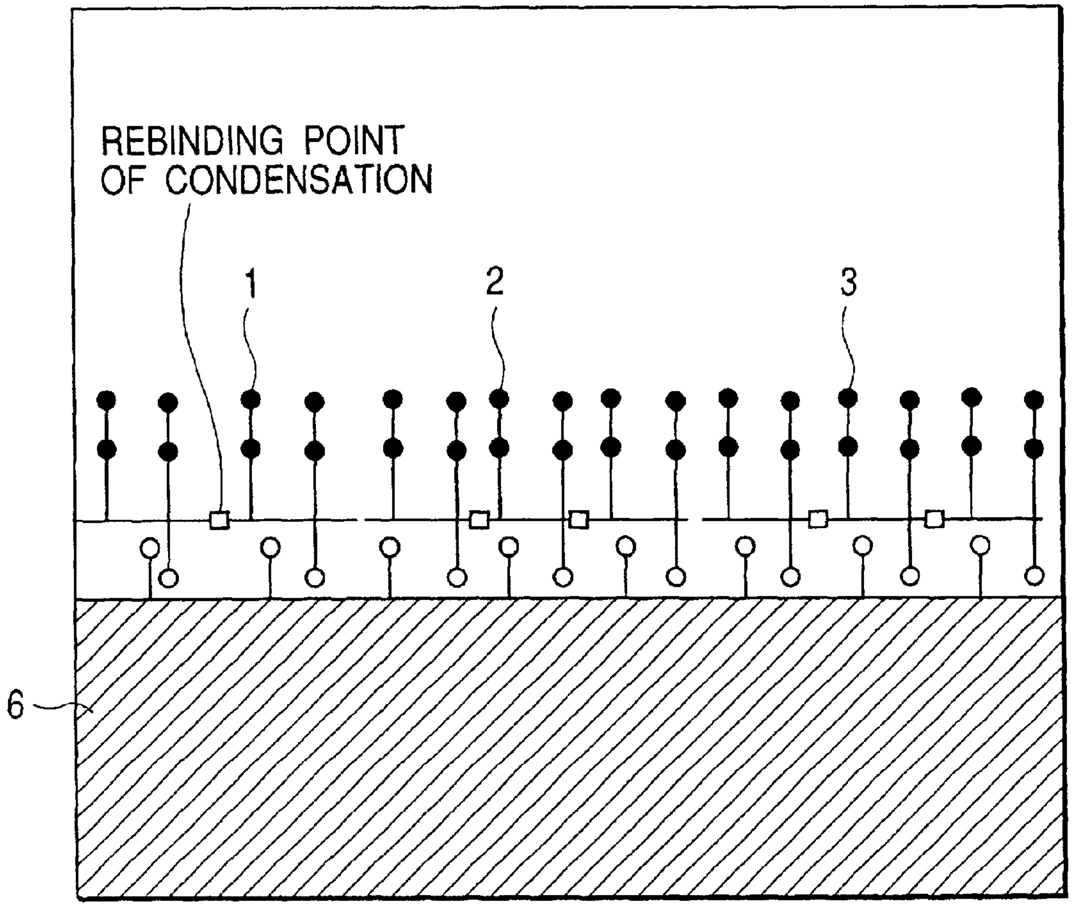
FIG. 19 is a conceptual view which shows the process in which the dissociated granulates themselves, originated from the polymer of surface reforming agent adhesively fixed on the surface, are rebound to each other by condensation reaction.

In this respect, with polysiloxane or the like used as polymer, which is capable of being bound at least in a part of granulates by the condensation of the granulates generated by cleavage, for example, it becomes possible to generate binding between the granulates which are adsorbed to the surface of the basis 6. In this way, the covering film of hydrophilic processing agent can be made firmer still. When polysiloxane is used, there may occurs the phenomenon in which the hydrophilic processing agent is adsorbed more stably after having been adsorbed to the surface of basis by the siloxane portion, which is dissociated due to the highly concentrated acid, and rebound with moisture in the air by condensation. FIG. 19 is a view which schematically shows such rebinding with moisture in the air due to the condensational reaction. Here, the mechanism of polymerization by the formation and condensation of granulates by cleavage by use of polysiloxane is conceivable as given below.

In other words, along with the controlled drying of the surface processing liquid on the processing surface, the concentration of a dilute acid contained in the surface processing agent is increased to make it a concentrated acid. The concentrated acid ($H_2SO_4$, for example) cleaves the binding of polysiloxane and siloxane. As a result, the granulates of polysiloxane and silyl sulfuric acid are generated (scheme 1). Then, with further drying of the processing liquid existing on the processing surface, the concentration of granulates in the surface processing liquid becomes higher, thus enhancing the contact probability between the granulates themselves. Consequently, as shown in the scheme 2, the granulates themselves are condensed to reproduce the siloxane rebinding. Also, the silyl sulfuric acid, which is the by-product thereof, causes the methyl group thereof to be orientated toward the processing surface, too, if the processing surface is hydrophobic, and sulfone group is orientated in the direction different from the processing surface. Conceivably, then, this contributes to the hydrophilic processing of the processing surface.

Scheme 1

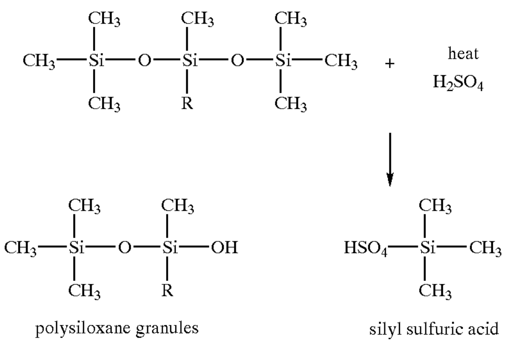

Figure 20:
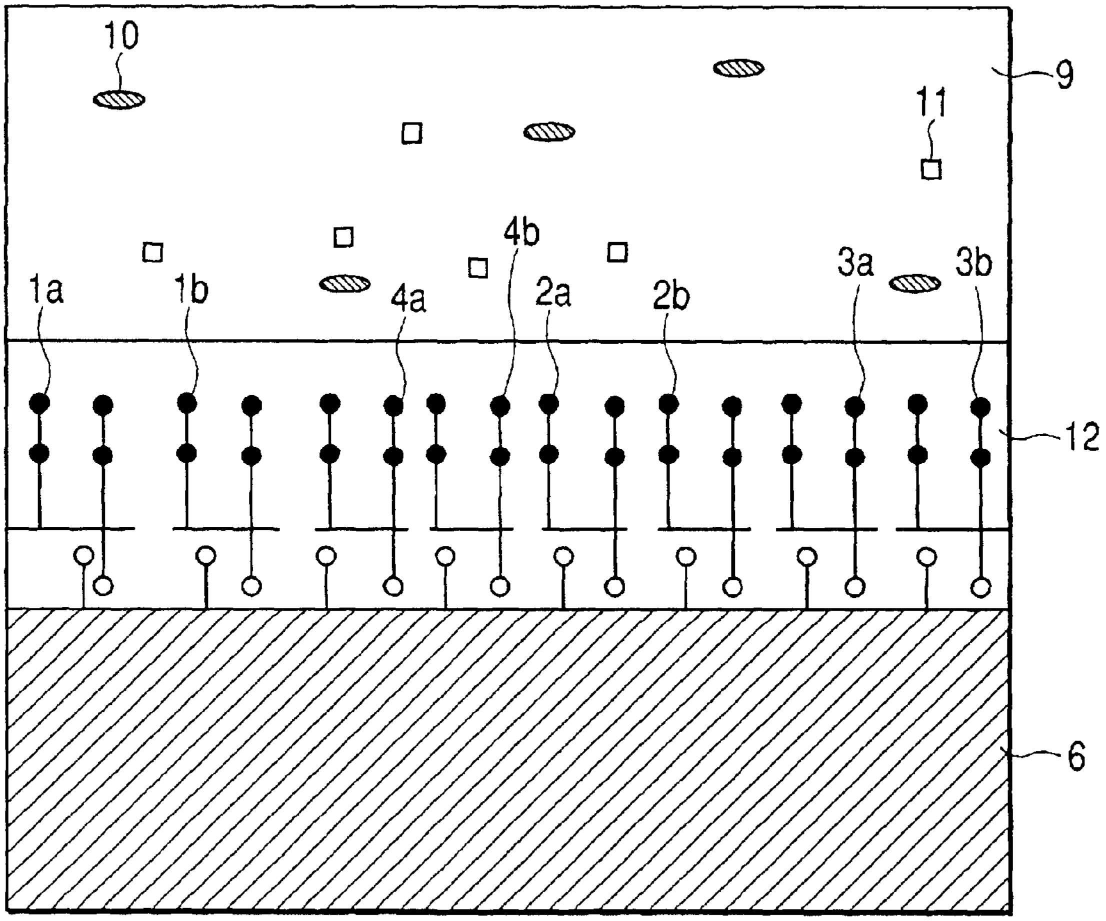
FIG. 20 is a conceptual view which shows the example where the surface reforming method applicable to the present invention is applied to the hydrophilic processing of a water-repellent surface, and also, the effect obtainable by adding water to the processing solution.

Here, FIG. 20 schematically shows one example of the state of a surface processing liquid having composition with water in a solvent utilized therefor. When water exists in the solvent of a processing liquid, water and volatile organic solution are evaporated (gaseous molecule of water is indicated at 11, and gaseous molecule of organic solution, at 10) in the evaporation of solvent from the processing liquid used for the hydrophilic processing accompanied by heating. At this juncture, the evaporating speed of the volatile organic solution is faster than that of water. Then, the moisture concentration in the processing liquid becomes higher so that the surface tension of the processing liquid increases. As a result, difference in surface energy is generated on the interface of the processing surface of the basis 6 and the processing liquid. On the interface of the processing surface of the basis 6 and the processing liquid (moisture layer at 12), where the moisture concentration thereof has become higher, the portion of the basis, which has substantially the same or the same surface energy as that of the processing surface of the basis 6 in the granulates 1*a* to 4*b* from the polymer that serves as a hydrophilic processing agent, is orientated to the processing surface side of the basis 6. On the other hand, the portion, which has the hydrophilic group of the granulates from the polymer serving as the hydrophilic processing agent, is orientated to the moisture layer 12 side where the moisture concentration has become higher due to the evaporation of the organic solvent. Consequently, it is conceivable that the designated orientational capability of the polymeric granulates is enhanced still more.

The present invention relates to the fiber absolvent for ink jet use that retains ink by means of negative pressure, and the hydrophilic process is given to the surface of fiber that forms the fiber absolvent. However, by means of the aforesaid element surface reformation applicable to the present invention, the target element is not necessarily limited to fiber. The various kind of elements are usable depending on the property and kinds of functional group possessed by polymer. Now, hereunder, the description will be made of several examples.

(1) In Case of Functional Group being Contained in Hydrophilic Group

Here, the target element is such as to require absorption like the ink absolvent or some others used for an ink jet system (if such element contains olefine fiber, the aforesaid embodiment is applicable). In this case, the surface reformation of the present invention can provide hydrophilic property capable of absorbing liquid (water ink or the like Scheme 2

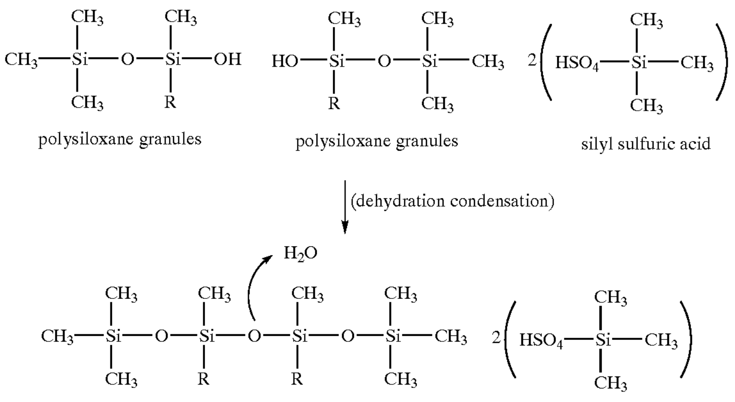

described in the aforesaid embodiment) instantaneously, and also, produce favorable effect on liquid retainability if needed.

(2) In a Case of Functional Group being Lipophilic

By means of the surface reformation applicable to the present invention, function is effectively given to the object that needs lipophilic property.

(3) Application of the Surface Reformation to Others

By means of the aforesaid principle of mechanism, the application thereof to others is all possible and included in the principle hereof.

Particularly, with the polymer serving as the processing agent, which contains a wettability improver (isopropyl alcohol: IPA, for example) that improves wettability to provide the surface wettability of an element and a polymeric solvent; a medium that generates polymeric cleavage; and the group (or groups) the surface energy of which is substantially the same or the same as the partial surface energy of the surface of element, but having different interfacial energy between this group and any one of the aforesaid functional groups, the surface reformation by condensation after cleavage can demonstrate excellent effects, and reliably provide the uniformity and property, which have never been attained by the conventional art.

Here, in the specification hereof, the property excellent in wettability with respect to liquid thus contained is called "lyophilic property".

Also, as the complementary concept of the present invention, it is possible to reduce the elution into ink or the eduction by ink of the neutralizer (calcium stearate, hydrotallsite, or the like) or other additives used for molding or forming fiber, if any contained in fiber, by the application of the aforesaid surface reforming method. Thus, a problem of the kind can be solved when polymeric film is formed in accordance with the present invention. Therefore, by means of the surface reforming method described above, it becomes possible to make the usable range larger for the additives such as neutralizer, and also, to prevent characteristics of ink per se from being changed, as well as those of the ink jet head itself from being changed.

Figure 28:
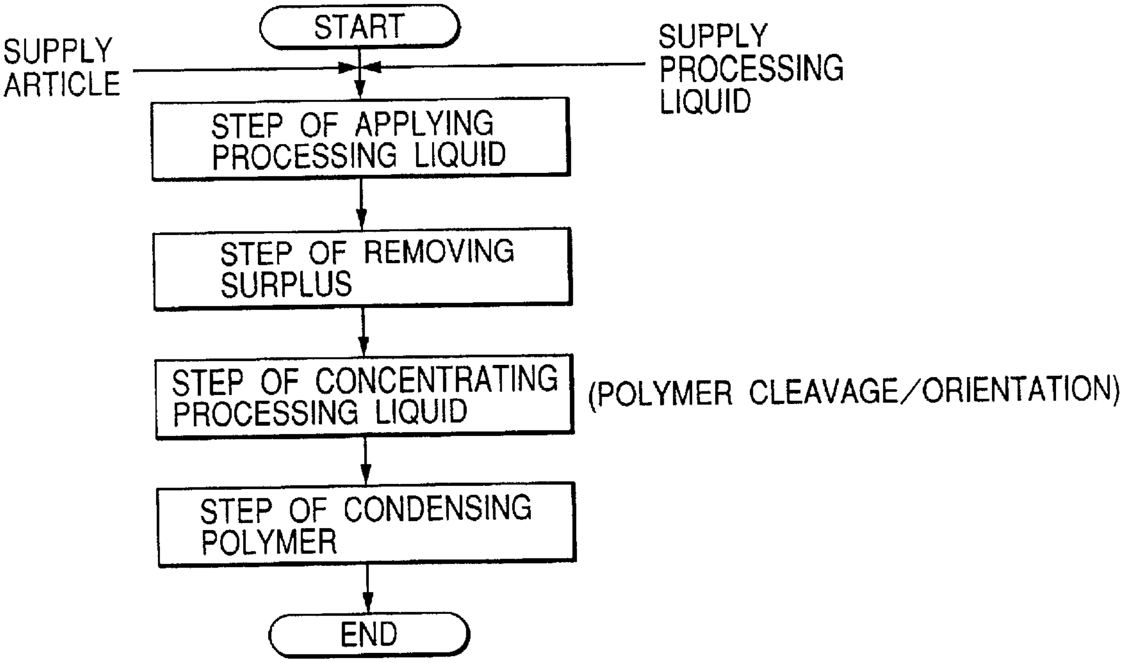
FIG. 28 is a view which shows one example of the manufacturing process of the surface reformation processing applicable to the present invention.

FIG. 28 is a view which shows one example of steps in manufacturing each of these kinds of elements. When manufacture begins, an element and processing liquid are provided. Then, the element the surface of which has been reformed can be obtained through the steps of applying the processing liquid to the surface of the element to be reformed (to the reforming surface); removing any excessive portion from the reforming surface; condensing the processing liquid for the cleavage of polymer on the reforming surface, as well as for the orientation of granulates; and evaporating the processing liquid for the polymerization by binding between the granulates. Through these steps, it is possible to obtain an element the surface of which has been reformed.

The processing liquid condensation and evaporation steps are preferably possible at a temperature higher than the room temperature (60° C., for example) in a continuous process of heating and drying. When polysiloxane for reforming the surface, which is formed by polyolefine resin, is used together with water, acid, and organic solvent (isopropyl alcohol, for example), the processing period may be 45 minutes to 2 hours, for example. If isopropyl alcohol of 40 weight % is used, it is approximately two hours, for example. In this respect, if the contents of water is made smaller, the time required for drying process can be shortened.

Here, in the example shown in FIG. 28, the formation of granulates by the cleavage of polymer is made on the reforming surface of the element, but it may be possible to allow them to be orientated by supplying the processing liquid that has already contains granulates to the reforming surface of the element.

As the composition of processing liquid, it is possible to utilize the one which contains, for example, the wettability improver as described earlier, which is a good polymeric solvent having effective component as the surface improver, and also, a wettability applicable to the reforming surface for the enhancement of the wettability of the processing liquid with respect to the reforming surface; solvent; polymeric cleavage catalyst; polymer having the functional group that provides the reforming effect for the reforming surface and the group for obtaining the adhesive function to the reforming surface.

PRINCIPLE APPLICATION EXAMPLE 1

Next, the description will be made of the example in which the aforesaid principle of surface reformation process is applied to polypropylene•polyethylene fiber aggregate. The polypropylene•polyethylene fiber aggregate is prepared by complexly composing fiber in a form of lump with configuration to enable ink or other liquid to be permeated for the purpose of retaining it, for example.

As described in the aforesaid embodiment, this is formed by fiber of biaxial structure of polypropylene and polyethylene, and the length of each fiber is approximately 60 mm.

For this example, the configuration of the target element is a fiber structure, and the retainability of liquid is generally higher than the element that has a flat surface. Therefore, the composition of the processing solution is arranged as given below.

TABLE 1

(Composition of hydrophilic processing liquid for fiber element)

| Component | Composition (weight %) |
|---|---|
| (polyoxialkylen).poly(dimethyl siloxane) | 0.40 |
| sulfuric acid | 0.05 |
| isopropyl alcohol | 99.55 |

By use of the hydrophilic processing liquid prepared in the above composition, the polypropylene•polyethylene fiber aggregate is manufactured by the method of manufacture in accordance with the first embodiment or the second embodiment.

COMPARATIVE EXAMPLE 1 AND REFERENTIAL EXAMPLE 1

As the comparative example 1, using the liquid prepared to contain only sulfuric acid and isopropyl alcohol for the fiber element hydrophilic processing liquid described above the polypropylene•polyethylene fiber aggregate is manufactured in accordance with the first embodiment or the second embodiment. In other words, the liquid, which is prepared by removing (polyoxialkylen)•poly(dimethyl siloxane) from the processing liquid shown by the Table 1, is used. Also, as the referential example 1, non-processed PP•PE fiber aggregate is used.

The evaluation of the surface processing condition of each fiber aggregate obtained by the operation described above, and the results thereof are as given below.

(1) Method for Evaluating the Hydrophilic Property of PP•PE Fiber Aggregate (a) Evaluation by Pure Water Droplets Using Syringe The PP•PE fiber aggregate processed using the principle application example 1, the PP•PE fiber aggregate of comparative example 1, and non-processed PP•PE fiber aggregate of referential example are given pure water droplets by use of a syringe from above, respectively, and the permeating condition thereof are observed.

(b) Evaluation by Dipping Into Pure Water

A container, which is large enough to contain the PP•PE fiber aggregate sufficiently, is filled with pure water. The PP•PE fiber aggregate processed using the principle application example 1, the PP•PE fiber aggregate of comparative example 1, and non-processed PP•PE fiber aggregate of referential example are slowly placed in the container. Then, the permeating condition of pure water into each of the PP•PE fiber aggregates is observed, respectively.

(2) The Results of the Hydrophilic Evaluation of the PP•PE Fiber Aggregates (a) The Results of Evaluation by Pure Water Droplets Using Syringe When pure water is dropped from above by use of the syringe on the PP•PE fiber aggregate processed using the principle application example 1, the pure water is permeated into the fiber aggregate instantaneously.

On the other hand, the PP•PE fiber aggregate of comparative example 1, and the non-processed PP•PE fiber aggregate of referential example 1 do not allow the pure water droplets from the syringe to be permeated into the PP•PE fiber aggregates at all, and the spherical liquid droplets are formed as if repelling on the PP•PE fiber aggregates.

(b) Results of Evaluation of Pure Water Dipping

When the PP•PE fiber aggregate processed by use of the principle application example 1 is slowly placed in the container filled with pure water, the PP•PE fiber aggregate is sank slowly into the water. This indicates that at least the surface of the PP•PE fiber aggregate manufactured by the method of the first embodiment or the second embodiment is provided with hydrophilic property.

On the other hand, when the PP•PE fiber aggregate of comparative example 1, and non-processed PP•PE fiber aggregate of referential example 1 are placed slowly in the container filled with pure water, the PP•PE fiber aggregate of referential example 1 and the non-processed PP•PE fiber aggregate are both in the state of floating completely on the pure water. Thereafter, these aggregates are not observed to absorb water at all, and there indicated water-repellent property clearly.

From the above results, it is found that by use of the processing liquid formed by polyalkylsiloxane having polyalkylene oxide chain, acid, and alcohol, the film of polyalkylsiloxane is formed on the fiber surface, thus effectively executing the surface hydrophilic process. Then, the PP•PE fiber aggregate thus manufactured is found to be capable of presenting the function as an ink absorber sufficiently even with respect to water ink.

As regards the results described above, that is, regarding the surface reformation applicable to the present invention, the observation is made for the SEM photographs of the fiber surface for the purpose of obtaining the verification as to the formation of polymeric film by the adhesion of polyalkylsiloxane having polyalkylene oxide chain onto the surface of the PP•PE fiber.

Figure 21:
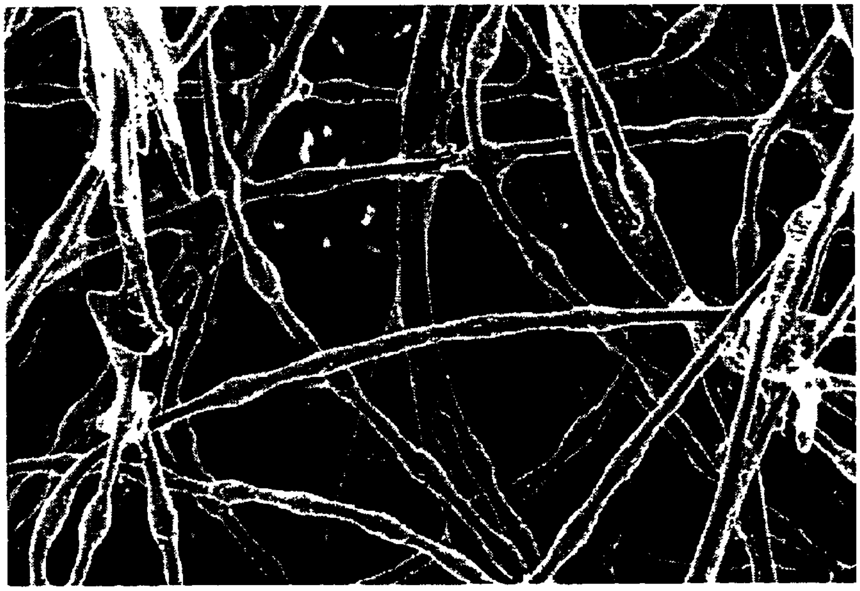
FIG. 21 is an SEM photograph substituting a figure of 150-time enlargement, which represents the fiber configuration of non-processed PP•PE fiber of the referential example 1 (non-processed PP•PE fiber aggregate) and the surface condition thereof.
Figure 22:
FIG. 22 is an SEM photograph substituting a figure of 500-time enlargement, which represents the fiber configuration of non-processed PP•PE fiber of the referential example 1 (non-processed PP•PE fiber aggregate), and the surface condition thereof.
Figure 23:
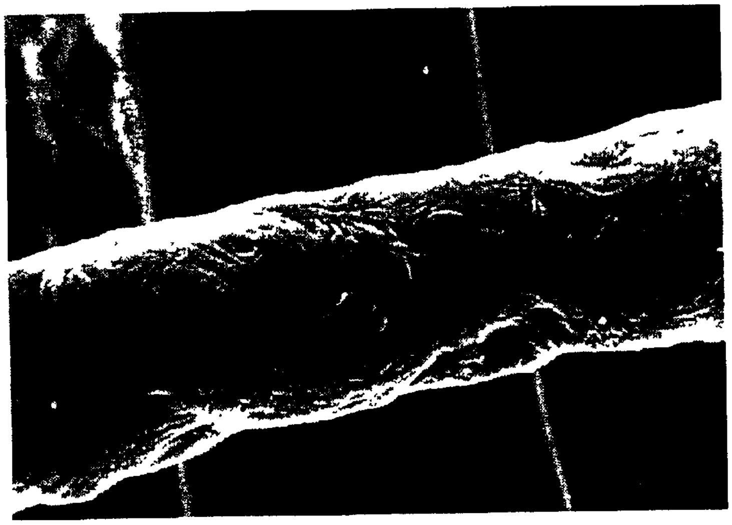
FIG. 23 is an SEM photograph substituting a figure of 2,000-time enlargement, which represents the fiber configuration of non-processed PP•PE fiber of the referential example 1 (non-processed PP•PE fiber aggregate), and the surface condition thereof.

FIG. 21, FIG. 22, and FIG. 23 represent the enlarged SEM photographs of non-processed PP•PE fiber aggregate of the referential example 1 (non-processed PP•PE fiber aggregate). Also, FIG. 24 represents the enlarged SEM photographs of PP•PE fiber aggregate of the comparative example 4 (PP•PE fiber aggregate processed only by acid and alcohol).

Figure 25:
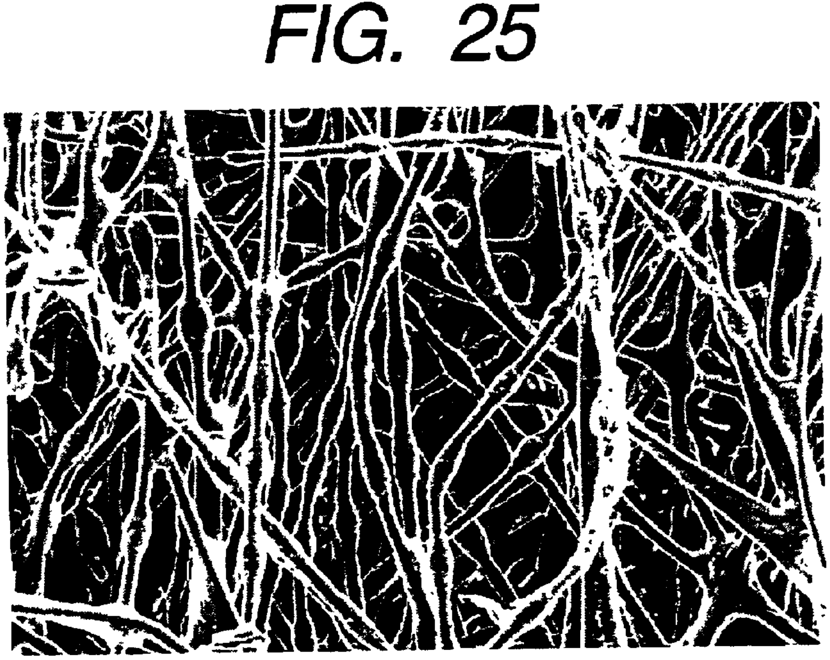
FIG. 25 is an SEM photograph substituting a figure of 150-time enlargement, which represents the processed PP•PE fiber configuration of the principle application example 1 (hydrophilic processed PP•PE fiber aggregate), and the surface condition thereof.
Figure 26:
FIG. 26 is an SEM photograph substituting a figure of 500-time enlargement, which represents the processed PP•PE fiber configuration of the principle application example 1 (hydrophilic processed PP•PE fiber aggregate), and the surface condition thereof.
Figure 27:
FIG. 27 is an SEM photograph substituting a figure of 2,000-time enlargement, which represents the processed PP•PE fiber configuration of the principle application example 1 (hydrophilic processed PP•PE fiber aggregate), and the surface condition thereof.

FIG. 25, FIG. 26, and FIG. 27 represent the enlarged SEM photographs of processed PP•PE fiber aggregate of the principle application example 1 (hydrophilic processed PP•PE fiber aggregate).

At first, there are determined no clear structural changes caused by the adhesion of organic substance on any one of the PP•PE fiber surfaces shown on the enlarged SEM photographs. Actually, as compared with the photographs of the 2,000-time enlargement shown in FIG. 23 representing the non-process PP•PE fiber and FIG. 27 representing the hydrophilic processed PP•PE fiber precisely, there are recognized no difference between the surface of non-processed PP•PE fiber aggregate and the hydrophilic processed surfaces of the PP•PE fiber aggregate according to the SEM observation. Here, for the hydrophilic processed PP•PE fiber, (polyoxialkylene)•poly(dimethyl siloxane) adheres uniformly to the fiber surface in the form of thin film (considered to be monomer film). Therefore, there are no distinct difference from the original fiber surface in terms of configuration, and it is determined that no difference is recognizable by the SEM observation.

Figure 24:
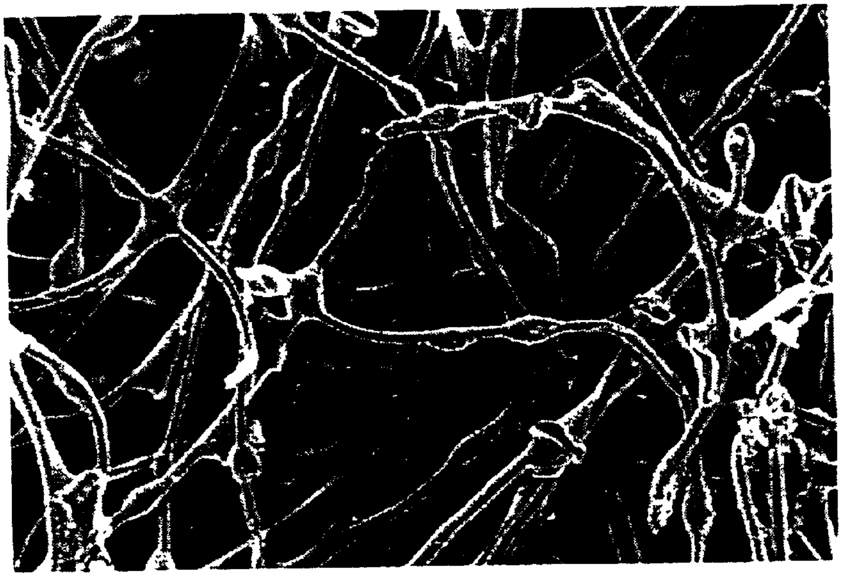
FIG. 24 is an SEM photograph substituting a figure of 150-time enlargement, which represents the acid processed PP•PE fiber configuration of the comparative example 1 (PP•PE fiber aggregate processed only for acid and alcohol), and the surface condition thereof.

On the other hand, when observing the SEM photograph of the PE•PP fiber processed only by acid and alcohol as shown in FIG. 24, many cuts are observed on the intersecting potions (fused points) of the fiber. Also, there are observed many knot-like sections. This change shows the result of deterioration of PP•PE molecules on the fiber surface, PE surface layer in particular, which is induced and promoted by the highly concentrated acid brought about by the evaporation of solvent and the heat generated by the drying process itself in the process of heating and drying.

Meanwhile, the hydrophilic processing liquid contains acid of the same concentration, and the same heating and drying are given, but it does not present cuts of the fiber binding portions and knot-like sections in the fiber as those observed on the PP•PE fiber processed only by acid and alcohol. This facts indicates that the deterioration of PE molecules on the fiber surface is suppressed by the hydrophilic processing liquid used for the principle application example 1. Conceivably, in this case, even when acid acts and generates cuts on the PE molecules on the fiber surface, and creates radical in the molecule, some substance and structure grasp the radical so as to suppress the radical that may destroy PE in chain. In grasping such radical, the (polyoxialkylen)•poly(dimethyl siloxane) that adheres to the fiber surface participates and forms the chemical binding with the PE surface in such a way to grasp the created radical. Here, therefore, it is undeniable that there are secondary phenomenon and effect of suppressing the PE/PP destruction that may be brought about by the radical chain.

All these being considered, it is determined that the fiber surface reformation in the principle application example 1 is achieved by the uniform adhesion of (polyoxialkylen)•poly (dimethyl siloxane) to the fiber surface. In the process thereof, it is anticipated that acid and solvent contained in the hydrophilic processing liquid produce cleaning effect on the fiber surface. Also, there is a predicted function to promote the physical adsorption of poly-alkyleneoxide chain. Besides, conceivably, there exists a good possibility of chemical binding between the PE molecule cut section brought about by the PE molecule cut caused by highly concentrated acid and heat, and polyalkylene oxide chain.

Further, in the principle application example 1, the polymeric film can be formed with easy even on the fiber surface formed from curved face as shown in the enlargement a in FIG. 6, for example. With such circumference of the surface (the outer circumferential configuration of the section thereof is in the form of closed chain) being covered by the polymeric film circularly, it becomes possible to prevent the surface reformed portion by the polymeric film from being peeled from the target element.

In this respect, among the biaxial fibers, there is the one having the core portion (core material) 1*b* is locally exposed on the outer wall face as shown in FIG. 3B, and the surface formed by surface layer (casing material) and the surface formed by core portion may be mixed in some cases. Even in such a case, with the execution of the surface reforming process of the present invention, both the exposed core portion and the surface of surface layer can be given hydrophilic property. Here, only when an interfacial active agent having hydrophilic function is coated and dried, the hydrophilic property thus given is easily lost if slightly crumpled for rinsing by pure water, because the interfacial active agent is dissolved and eluted into water immediately, although the hydrophilic property is locally obtainable at the initial stage.

PRINCIPLE APPLICATION EXAMPLES 2 AND 3

Next, the description will be made of the example in which the aforesaid principle of the surface hydrophilic process is applied to polypropylene fiber aggregate (PP fiber aggregate). More specifically, as the PP fiber aggregate, a fiber lump of 2 denier fiber diameter formed in a rectangle of 2 cm×2 cm×3 cm is utilized.

At first, hydrophilic processing solutions of the following two kinds of compositions are prepared.

TABLE 2

(Composition of hydrophilic processing liquid)

| Compound | Composition (weight %) |
|---|---|
| (polyoxialkylene).poly(dimethyl siloxane) | 0.1 |
| sulfuric acid | 0.0125 |
| isopropyl alcohol | 99.8875 |

TABLE 3

(Composition of hydrophilic processing liquid)

| Compound | Composition (weight %) |
|---|---|
| (polyoxialkylene).poly(dimethyl siloxane) | 0.1 |
| sulfuric acid | 0.0125 |
| isopropyl alcohol | 40.0 |
| pure water | 59.8875 |

The second composition (principle application example 3) is prepared as listed above by adding isopropyl alcohol and pure water in that order. Here, the sulfuric acid and (polyoxialkylene)•poly(dimetyl siloxane) are diluted four times.

Here, in accordance with the first embodiment or the second embodiment, there are obtained the PP fiber aggregate (principle application example 2) which is manufactured using the solution of the first composition (Table 2) having isopropyl alcohol as the main solvent thereof as hydrophilic processing liquid, and the PP fiber aggregate (principle application example 3) which is manufactured using the solution of the second composition having water and isopropyl alcohol as the mixed solvent thereof.

REFERENTIAL EXAMPLE 2

A non-processed PP fiber aggregate is used as the referential example 2.

The non-processed PP fiber aggregate of the referential example 2, the surface of which is hydrophobic, is reformed to present the hydrophilic surface as the PP fiber aggregate of the principle application example 2 and the PP fiber aggregate of principle application example 3 as in the case of the principle application example 1. For the purpose of evaluating the degrees of hydrophilic property, water ink ($\gamma$=46 dyn/cm) 7 g is prepared in a petri dish, and on the surface of ink liquid, the PP aggregate of principle application example 2 and PP fiber aggregate of principle application example 3, and the non-processed PP fiber aggregate of referential example 2 are gently placed.

Whereas the non-processed PP fiber aggregate of referential example 2 is in a state of floating on the water ink, the PP fiber aggregate of principle application examples 2 and PP fiber aggregate of principle example 3 have absorbed ink from the bottom faces thereof, respectively. However, there is a clear difference in the amount of absorbed water ink between them when comparing the PP fiber aggregate of principle application example 2 and the PP fiber aggregate of principle application example 3. The PP fiber aggregate of principle application example 2 has absorbed ink on the petri dish completely, but the PP fiber aggregate of principle application example 3 has left approximately a half of ink on the petri dish.

There is essentially no distinct difference in the total amount of (polyoxialkylene)•poly(dimethyl siloxane) serving as the polymer that covers the surfaces of the PP fiber aggregate of principle application example 2 and PP fiber aggregate of principle application example 3. However, the degrees of orientation of the polymer itself are different when covering each surface, and conceivably, this difference brings about the difference in absorption between them.

For example, for the PP fiber aggregate of principle application example 2, the polymer that covers the surface thereof is substantially orientated, but completes its adhesion in a state of presenting local disturbance in orientation. On the other hand, such disturbance in orientation is significantly small in the PP fiber aggregate of principle application example 3.

It is determined that a concentrated covering film having superior orientation is attainable by adding isopropyl alcohol, and water as solvent as well, to the hydrophilic process by use of (polyoxialkylene)•poly(dimethyl siloxane). The processing liquid itself is needed to wet the surface uniformly. Therefore, it is desirable to contain isopropyl alcohol in an amount of at least 20% approximately. Now, even if the content of isopropyl alcohol is smaller than 40% as in the case of the principle application example 3, it is conceivable to make covering possible. In other words, in the process of evaporating and drying solvent, isopropyl alcohol is volatilized faster. Then, during this period, the content of isopropyl alcohol is reduced more. Taking this into consideration, it is conceivable that film covering is possible even if the content of isopropyl alcohol is 40% or less initially. Also, from the standpoint of industrial safety, the content of isopropyl alcohol should preferably be 40% or less.

Also, the aforesaid technical thought of the reforming method, as well as of the reformed surface and element, is of course applicable to all the porous elements other than the fiber aggregate that serves as the negative pressure generating member.

In this respect, the negative pressure generating member, which is uniquely processed to be hydrophilic by means of the method disclosed in the aforesaid embodiments, produces the effect that when ink is absorbed again after the absorbed ink (liquid) in the negative pressure generating member has been drawn out, the amount of ink retained then in the negative pressure generating member is substantially equal, irrespective of the amount of drawn-out ink or the frequency of repeated absorption, that is, the negative pressure is made to be able to return to the initial condition as the significant effect of the present invention.

Meanwhile, in the mode in which a liquid container is detachably installed on a negative pressure generating member containing chamber, the retaining amount of liquid in the negative pressure generating member containing chamber is varied when liquid containers are replaced, depending on condition that liquid is retained up to near the joint pipe serving as the connector with the ink outlet port or liquid has been consumed up to near the ink supply port, or there is no ink that can be consumed (or supplied), among some other conditions. With the application of the present invention, however, it is made possible to return the negative pressure in the ink supply port portion of the negative pressure generating member containing chamber to the initial level (negative pressure and quantity) at all times by use of the hydrophilic processed negative pressure generating member obtained by means of any one of the methods disclosed in the aforesaid embodiments, irrespective of the frequency of replacements, and the remaining amount of liquid in the negative pressure generating member containing chamber before replacement.

As described above, in accordance with the present invention, the fiber surface is reformed to provide hydrophilic property in single fiber or a unit of small aggregate existing in the stage before the final fiber aggregate is manufactured, hence making it possible to enable the uniform hydrophilic property of fiber aggregate to be enhanced still more on the entire area of the fiber aggregate as compared with a surface reforming process is given after the target fiber aggregate has been manufactured finally. Also, with the hydrophilic processing liquid being made adhesive to the fiber surface in the stage of single fiber or small aggregate, it becomes possible to make the processing steps and processing time smaller than the case where it is made adhesive to a finished fiber aggregate.

As the aforesaid lyophilic processing liquid, the liquid, which contains polyalkyl siloxane having hydrophilic group, acid, alcohol, and water, is used. Then, it becomes possible to provide lyophilic property for the fiber surface of olefine resin.

With the aforesaid small aggregate being formed with crimped short fibers in the uniform fiber direction, there occur intersecting points of fibers themselves even if the fiber direction is uniform to make it possible to thermally bond fibers themselves.

Also, as the aforesaid fiber, there are formed a core portion and a surface layer that covers the core portion, and the core portion and the surface layer are formed by olefine resin. Then, by use of the fiber that has a higher fusion point of the resin that forms the core portion than that of the surface layer, the intersecting points of fibers themselves are thermally bonded. At this juncture, heating is given at a temperature higher than the fusion point of the aforesaid surface layer (polyethylene) but lower than the fusion point of the aforesaid core portion (polypropylene) so as to form a structure to enable polyethylene itself to be fused together for the surface layer (casing material) located for fibers to be in contact with each other.

Further, with the provision of a cutting process for the aforesaid method of manufacture after the thermo-fusion process to cut the fiber aggregate in a desired shape, it is possible for the fiber aggregate to be given cut section and non-cut section when manufactured so as to provide different characteristics on these sections, respectively. In other words, the fiber aggregate can be manufactured with the fiber surface formed having the cut section formed by hydrophobic olefine resin, and the non-cut section processed to be lyophilic.

Also, for the liquid container provided with a first chamber partly communicated with the atmosphere, which contains an absorber that absorbs liquid; a second chamber closed from the outside, which contains liquid; a communicative passage near the bottom of the container that enables the first and second chambers to be communicated; and a liquid supply port for the ink jet head which is the external portion of the container, the fiber aggregate manufactured by the method of manufacture of the present invention is used as an absorber, and the cut section of the fiber aggregate is placed to face the partition wall that partitions the first chamber and the second chamber. Then, with such partition face, the surface formed mostly by hydrophobic olefine resin is in contact, thus making it difficult for liquid to reside between the fiber aggregate and the partition face. As a result, along with the consumption of retained liquid by the ink jet head, the gas-liquid exchange can be made rapidly between the first chamber and the second chamber. Consequently, at the time of gas-liquid exchange, it becomes possible to make the liquid supply in high flow rate from the second chamber to the first chamber even if a large amount of ink is consumed by the ink jet heat at a time.

What is claimed is:

1. A method for manufacturing a fiber aggregate formed by fiber having reforming surface, comprising the following steps of:

providing a fiber surface having thermoplastic resin at least on the surface layer thereof with a hydrophilic processing liquid containing polymer having a first portion with more hydrophilic group than said surface, and a second portion having interfacial energy different from that of said hydrophilic group, and interfacial energy substantially equal to the surface energy of said fiber;

orientating the second portion toward said fiber surface, while orientating polymer to the side different from the surface of the first group; and forming a fiber absorber by heating said fiber having the reformed surface in said step of orientating polymer to thermally bond the contact points of fibers themselves; and providing a catalyst for cleaving polymer in said processing liquid, wherein said polymer is cleaved into subdivided polymer on the surface of said portion by the utilization of said catalyst for cleaving polymer.

2. A method for manufacturing a fiber aggregate according to claim 1, further comprising the following step of:

binding said subdivided polymer themselves on the surface of said portion.

3. A method for manufacturing a fiber aggregate according to claim 1, wherein as said hydrophilic processing liquid, a liquid containing polyalkylsiloxane having hydrophilic group, acid, alcohol, and water is used.

4. A method for manufacturing a fiber aggregate according to claim 1, wherein said small aggregate is formed by crimped short fibers, and the fiber direction is made uniform.

5. A method for manufacturing a fiber aggregate according to claim 1, wherein fiber having a core portion and a surface layer to cover said core portion is used as said fiber, and said core portion and said surface layer are formed by olefine resin, respectively, and the fusion point of resin forming said core portion is higher than the fusion point of resin forming said surface layer.

6. A method for manufacturing a fiber aggregate according to claim 5, wherein when the intersecting points of fibers themselves are thermally bonded, heating is given at a temperature higher than the fusion point of said surface layer and lower than the fusion point of said core portion.

7. A method for manufacturing a fiber aggregates according to claim 5 or claim 6, wherein resin forming said core portion is polypropylene, and resin forming said surface layer is polyethylene.

8. A method for manufacturing a fiber aggregate according to claim 1, further comprising the following step of:

cutting in a desired shape after the step of thermal bonding.

9. A method for manufacturing a fiber aggregate formed by fiber having reforming surface, comprising the following steps of:

providing a fiber surface having thermoplastic resin at least on the surface layer thereof with a hydrophilic processing liquid containing polymer having a first portion with more hydrophilic group than said surface, and a second portion having interfacial energy different from that of said hydrophilic group, and surface energy substantially equal to the surface energy of said fiber;

thermally bonding the contacts points of fibers themselves by heating the fibers provided with said processing liquid, and forming a fiber absorber having the surface reformed by orientating the first portion toward said fiber surface and the first portion to the side different from the surface; and providing a catalyst for cleaving polymer in said processing liquid, wherein said polymer is cleaved into subdivided polymer on the surface of said portion by the utilization of said catalyst for cleaving polymer.

10. A method for manufacturing a fiber aggregate formed by fiber having reforming surface, comprising the following steps of:

providing a fiber surface with a hydrophilic processing liquid containing polymer having a first portion having hydrophilic group, and a second portion having interfacial energy different from that of said hydrophilic group, and interfacial energy substantially equal to the surface energy of said fiber;

forming a fiber aggregate by heating fibers provided with said processing liquid, and forming a fiber absorber having the surface reformed by orientating the second portion toward the said fiber surface, while orientating the first portion to the side different from the surface; and providing a catalyst for cleaving polymer in said processing liquid, wherein said polymer is cleaved into subdivided polymer on the surface of said portion by the utilization of said catalyst for cleaving polymer.

* * * * *

UNITED STATES PATENT AND TRADEMARK OFFICE

CERTIFICATE OF CORRECTION

PATENT NO. : 6,863,762 B2
DATED : March 8, 2005
INVENTOR(S) : Mikio Sanada et al.

It is certified that error appears in the above-identified patent and that said Letters Patent is hereby corrected as shown below:

Column 1,
Line 25, “polyorefine” should read -- polyolefine --.

Column 6,
Line 1, “manufactured” should read -- manufacture --.

Column 8,
Line 25, “brow” should read -- blow --;
Line 47, “(PE)” should read -- (PP) --; and
Line 61, “fibers” should read -- fiber --.

Column 9,
Lines 49, 61, 63 and 64, “silver 51” should read -- sliver 51 --.

Column 10,
Line 1, “silver” should read -- sliver --; and
Line 4, “silver 51” should read -- sliver 51 --.

Column 11,
Line 38, “area a” should read -- area α --.

Column 18,
Line 31, “form” should read -- from --.

Column 20,
Line 48, “calling” should read -- called --.

Column 21,
Line 46, “polyorefine,” should read -- polyolefine, --.

Column 23,
Line 19, “polyoxialkylene•poly-” should read -- polyoxyalkylene•poly- --.

Column 24,
Line 44, “again;” should read -- agent; --.

Column 28,
Lines 41 and 60, “(polyoxialkylene)” should read -- (polyoxyalkylene) --.

Column 30,
Lines 19, 48 and 56, “(polyoxialkylene)” should read -- (polyoxyalkylene) --.

UNITED STATES PATENT AND TRADEMARK OFFICE
CERTIFICATE OF CORRECTION

PATENT NO. : 6,863,762 B2
DATED : March 8, 2005
INVENTOR(S) : Mikio Sanada et al.

It is certified that error appears in the above-identified patent and that said Letters Patent is hereby corrected as shown below:

Column 31,
Lines 41 and 52, "(polyoxialkylene)" should read -- (polyoxyalkylene) --; and
Line 61, "(polyoxialkylene)•poly(dimetyl siloxane)" should read
-- (polyoxyalkylene)•poly(dimethyl siloxane) --.

Column 32,
Lines 35 and 53, "(polyoxialkylene)" should read -- (polyoxyalkylene) --.

Column 35,
Line 22, "aggregates" should read -- aggregate --.

Signed and Sealed this

Third Day of January, 2006

JON W. DUDAS
*Director of the United States Patent and Trademark Office*